(12) United States Patent
Nakata et al.

(10) Patent No.: US 11,613,013 B2
(45) Date of Patent: Mar. 28, 2023

(54) ROBOT CONTROL DEVICE

(71) Applicant: Panasonic Intellectual Property Management Co., Ltd., Osaka (JP)

(72) Inventors: Hiroyuki Nakata, Osaka (JP); Hiroyoshi Ueda, Osaka (JP); Atsumi Hashimoto, Osaka (JP); Ryosuke Yamamoto, Osaka (JP); Yasuyoshi Honuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 16/726,302

(22) Filed: Dec. 24, 2019

(65) Prior Publication Data

US 2020/0130181 A1    Apr. 30, 2020

Related U.S. Application Data

(63) Continuation of application No. PCT/JP2018/023611, filed on Jun. 21, 2018.

(30) Foreign Application Priority Data

Jul. 11, 2017   (JP) .............................. JP2017-135620

(51) Int. Cl.
   *B25J 9/16*        (2006.01)

(52) U.S. Cl.
   CPC ........... *B25J 9/1635* (2013.01); *B25J 9/1633* (2013.01); *B25J 9/1694* (2013.01)

(58) Field of Classification Search
   CPC ....... B25J 9/1635; B25J 9/1633; B25J 9/1694
   See application file for complete search history.

(56) References Cited

U.S. PATENT DOCUMENTS 4,933,864 A * 6/1990 Evans, Jr ............. G05D 1/0253
                                                        318/587
6,295,484 B1    9/2001 Ojima et al.
(Continued)

FOREIGN PATENT DOCUMENTS

JP      10-329063       12/1998
JP      3493765 B       2/2004
(Continued)

OTHER PUBLICATIONS

International Search Report of PCT application No. PCT/JP2018/023611 dated Sep. 25, 2018.
(Continued)

*Primary Examiner* — Khoi H Tran
*Assistant Examiner* — Aaron G Cain
(74) *Attorney, Agent, or Firm* — Wenderoth, Lind & Ponack, L.L.P.

(57) ABSTRACT

A robot control device includes the following: a main control unit; a servo control unit, which receives a position command θc from the main control unit; and a bending correction block (24), which corrects the bending of the reduction gear connected to the servo motor. The bending correction block (24) includes the following: a first position-correction-value calculation means (63), which finds a first position-command correction value θsgc based on the position command θc; and a second position-command-correction-value calculation means (64), which finds a second position-command correction value θskc based on the interference torque τa. The servo control unit drives the servo motor based on a new position command obtained by adding the first position-command correction value θsgc and the second position-command correction value θskc to the position command θc.

6 Claims, 20 Drawing Sheets

(56) References Cited

U.S. PATENT DOCUMENTS

| | | | |
|---|---|---|---|
| 2006/0071625 A1 | 4/2006 | Nakata et al. | |
| 2011/0121068 A1* | 5/2011 | Emanuel | B66F 9/0755 |
| | | | 235/375 |
| 2014/0044158 A1* | 2/2014 | Raghu | H04B 1/0039 |
| | | | 375/224 |
| 2015/0105905 A1* | 4/2015 | Nishida | B23K 9/0216 |
| | | | 700/254 |
| 2015/0112484 A1 | 4/2015 | Nishida et al. | |
| 2015/0258685 A1* | 9/2015 | Matsumoto | B25J 9/1633 |
| | | | 700/261 |
| 2016/0144511 A1* | 5/2016 | Romanov | G05D 1/0253 |
| | | | 701/28 |
| 2017/0172680 A1* | 6/2017 | Bowling | A61B 34/10 |
| 2017/0266811 A1* | 9/2017 | Ogawara | B25J 9/1633 |
| 2019/0075252 A1* | 3/2019 | Zhao | H04N 7/181 |

FOREIGN PATENT DOCUMENTS

| | | |
|---|---|---|
| JP | 2005-052913 | 3/2005 |
| JP | 2011-212823 | 10/2011 |
| JP | 2013-248682 | 12/2013 |
| JP | 2014-33535 | 2/2014 |
| WO | 2005/009692 | 2/2005 |

OTHER PUBLICATIONS

English Translation of Chinese Search Report dated Jul. 29, 2022 in related Chinese Patent Application No. 201880045677.3.

\* cited by examiner

ROBOT CONTROL DEVICE

This application is a continuation of the PCT International Application No. PCT/JP2018/023611 filed on Jun. 21, 2018, which claims the benefit of foreign priority of Japanese patent application No. 2017-135620 filed on Jul. 11, 2017, the contents all of which are incorporated herein by reference.

TECHNICAL FIELD

The present disclosure relates to a robot control device, and more particularly, to the correction of the position error of the robot arm when the position error is caused by the bending of reduction gears.

BACKGROUND ART

In order to reduce takt time and improve the accuracy of finished workpieces, there is a growing demand in recent years for laser processing in, for example, welding or cutting. The speed and accuracy of the laser processing are usually improved by attaching a laser output device to the arm tip of articulated robots.

The arm of a typical articulated robot is operated by driving servo motors to rotate the joint shafts of the robot. The driving force of the servo motors is transmitted to the joint shafts through the reduction gears connected to the servo motors. However, such an articulated robot can have a discrepancy between the position of the robot arm tip specified to the servo motors and the actual position of the robot arm tip. The discrepancy is due to the bending of the spring components of the reduction gears. Such bending can occur, for example, when the robot arm is subjected to a gravitational force (hereinafter, gravitational torque) or when one of the joint shafts of the robot arm is subjected to an interference force (hereinafter, interference torque) from other joint shafts.

To overcome the bending problem, there has been a suggestion to calculate a correction value based on the amount of bending and to add the correction value to the position command (see Patent Literature 1, for example). To be more specific, the amount of bending is found by calculating the external torque applied to the reduction gear of each joint shaft and dividing the external torque by the spring constant of the reduction gear. The amount of bending corresponds to the amount of position error of the robot arm tip due to the bending or to the amount of position error of the joint shaft angle. The correction value based on the amount of bending is added to the position command in the opposite direction.

CITATION LIST

Patent Literature

PTL 1: Japanese Patent No. 3493765

SUMMARY

Technical Problem

In an articulated robot, the behavior of bending in the reduction gear differs between components due to gravitational torque and components due to interference torque. Therefore, bending correction is not always performed properly when the correction is based directly on the external torque, which is the sum of the gravitational and interference torques, as in the above-described well-known art.

In view of these circumstances, an objective of the present disclosure is to provide a robot control device that is less influenced by the bending of the reduction gears so as to correct the position error of the robot arm with high accuracy.

Solution to Problem

To achieve the objective, the robot control device of a first aspect of the present disclosure separately finds the gravitational and interference torques to be applied to the reduction gears connected to the joint shafts. The gravitational and interference torques thus obtained are separately used to find bending correction values, and these values are used to correct the position command to be given to the motors.

To be more specific, the robot control device of the first aspect of the present disclosure is a robot control device for controlling the movement of a robot arm having a joint shaft driven through a reduction gear connected to a servo motor, the robot control device including:

a main control unit configured to transmit a position command to the joint shaft;

a bending correction means configured to correct the position error of the robot arm, the position error being due to the bending of the reduction gear, the bending correction means including:

a first position-command-correction-value calculation means configured
to calculate, based on the position command, a gravitational torque as part of an external torque causing the bending of the reduction gear and
to find a first position-command correction value based on the gravitational torque; and a second position-command-correction-value calculation means configured
to calculate, based on the position command and the gravitational torque, an interference torque as part of the external torque, the interference torque being due to the interference to which the joint shaft is subjected, and
to find a second position-command correction value based on the interference torque; and a servo control unit configured to drive the servo motor based on a new position command obtained by adding the first position-command correction value and the second position-command correction value to the position command.

This structure separates the influence of the gravitational torque and the influence of the interference torque on the bending and finds the position-command correction values separately for these torques, thereby correcting the position error of the robot arm with high accuracy.

The second position-command correction value is preferably obtained by compensating the amplitude and phase of the bending correction value obtained based on the interference torque.

This structure ensures the correction of the influence of the bending due to the interference torque.

The robot control device of a second aspect of the present disclosure is a robot control device for controlling the movement of a robot arm having a joint shaft driven through a reduction gear connected to a servo motor, the robot control device including:

a main control unit configured to transmit a position command to the joint shaft;

a bending correction means configured to correct the position error of the robot arm, the position error being due to the bending of the reduction gear, the bending correction means including:
  a first position-command-correction-value calculation means configured
    to calculate, based on the position command, a gravitational torque as part of an external torque causing the bending of the robot arm and
    to find a first position-command correction value based on the gravitational torque; and
  a current compensation value calculation means configured
    to calculate, based on the position command and the gravitational torque, an interference torque as part of the external torque, the interference torque being due to interference to which the joint shaft is subjected, and
    to find a current compensation value based on the interference torque; and
a servo control unit configured to drive the servo motor based on the following commands:
  a new position command obtained by adding the first position-command correction value to the position command; and
  a new motor current command obtained by adding the current compensation value to a motor current command generated based on the new position command.

This structure separates the influence of the gravitational torque and the influence of the interference torque on the bending and finds the compensation value for the motor current with respect to the interference torque. This enables the correction of the position error of the robot arm with high responsivity.

The current compensation value is preferably obtained by compensating both the amplitude and phase of the bending correction value obtained based on the interference torque and multiplying the bending correction value by a predetermined coefficient.

This structure ensures the correction of the influence of the bending due to the interference torque.

The servo motor may be one of n servo motors, the n being an integer not less than 2,
the reduction gear may be one of n reduction gears connected to the n servo motors,
the joint shaft may be one of n joint shafts driven through the n reduction gears,
the servo control unit may be one of n servo control units for driving the n servo motors,
the position command may be one of n position commands for specifying the respective positions of the n joint shafts,
the bending correction means may be one of n bending correction means corresponding to the n servo control units, and
the position error of the robot arm due to the bending may be corrected based on the n position commands.

This structure performs the bending correction by using the position command of the servo motors connected to the respective joint shafts. This eliminates the need for a dedicated component such as a torque sensor, thereby reducing the cost.

It is preferable that the external and gravitational torques should be obtained by dynamic calculation and that the interference torque should be obtained by subtracting the gravitational torque from the external torque.

This structure can easily separate the gravitational and interference torques from each other, thereby correcting the position error of the robot arm caused by the bending.

Advantageous Effects of Invention

As described above, the present disclosure separates the bending due to the gravitational torque and the bending due to the interference torque from other joint shafts, thereby correcting the position error of the robot arm with high accuracy.

DESCRIPTION OF EMBODIMENTS

The present disclosure will now be described in detail by means of exemplary embodiments with reference to the drawings. It should be understood that the exemplary embodiments are merely exemplary of the present disclosure and are not intended to limit the present disclosure, its application, or use.

The Findings on which the Present Disclosure is Based

As described above, the bending of the spring components of the reduction gears causes a position error of the robot arm. To correct the bending, it is preferable to take the external torque applied to the reduction gears into consideration. The external torque contains the gravitational torque and the interference torque, which is applied from other joint shafts. The inventors of the present application have found that the gravitational and interference torques have different influences from each other on the position command after the bending correction. To be more specific, they have found that these torques have different response frequencies from each other. This finding will be described as follows by taking the operation of a vertical articulated robot as an example.

The Structure and Operation of the Vertically Articulated Robot

Figure 1:
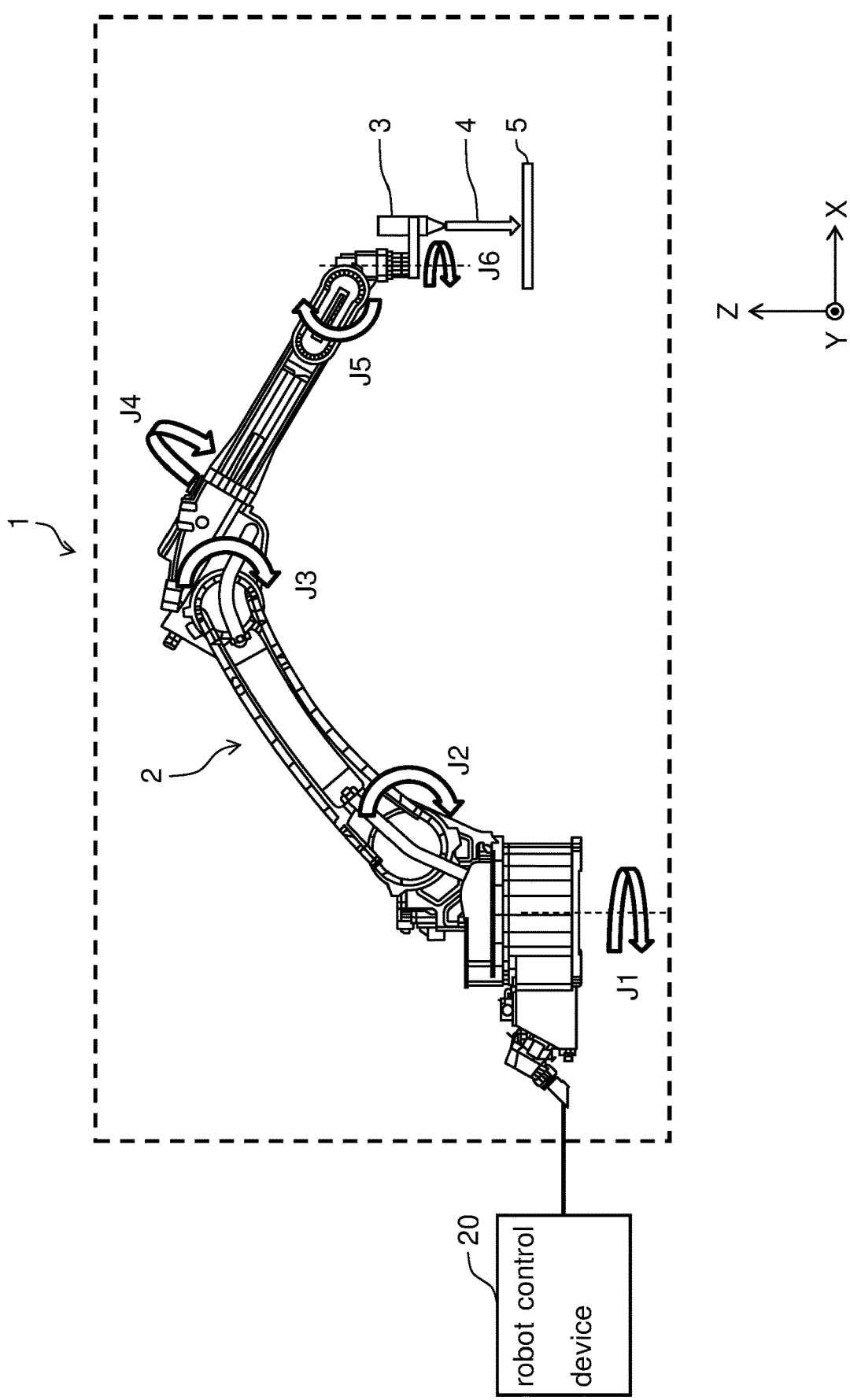
FIG. 1 shows the structure of a six-axis vertical articulated robot.

FIG. 1 shows the structure of a well-known vertical articulated robot used for laser welding and cutting. This six-axis vertical articulated robot 1 includes robot arm 2 and joint shafts J1 to J6. Robot arm 2 consists of a plurality of parts. These parts are connected to each other through joint shafts J1 to J6. Joint shafts J1 to J6 are connected to servo motors (not shown) through respective reduction gears (not shown). Robot control device 20 drives the servo motors according to the position command θc (see FIG. 10) so as to rotate joint shafts J1 to J6 by desired amounts, thereby controlling the operation and attitude of robot arm 2. Robot arm 2 has laser output device 3 mounted at its tip. Laser output device 3 is connected to a laser light source (not shown) for generating laser light 4 and an optical fiber (not shown) for guiding laser light 4.

In the following description, robot 1 includes a total of six joint shafts: main three shafts J1 to J3, which determine the attitude of robot 1 as a whole, and distal three shafts J4 to J6, which determine the orientation of the arm tip. Note that the directions X, Y, and Z shown in FIG. 1 may be used to describe the position and movement of robot 1.

Assume that laser output device 3 emits laser light 4 to cut workpiece 5 and that laser output device 3 has a mass of about 5 kg. Once the position and direction of radiation of laser light 4 are determined, the attitude of robot arm 2, or the angle of each joint shaft of robot 1 is uniquely determined. Thus, the joint shafts have no control redundancy, so that when workpiece 5 is being cut into a circle, all the joint shafts operate.

Assume that workpiece 5 is cut into a circle with a diameter of 10 mm at a rate of 10 m/min. In this case, the operation time is about 0.2 seconds, and the operating frequency is about 5 Hz. Each joint shaft operates upon receiving a sinusoidal position command θc corresponding to the operating frequency. The actual frequency at which each joint shaft can operate in response to the position command θc is defined as the position response frequency, and the actual position of each joint shaft (hereinafter, actual position) is referred to as θL. The position command θc is an angle command indicating the amount of rotation angle of each joint shaft. The actual position θL indicates the actual amount of rotation angle of each joint shaft. The position response frequency is determined by the natural oscillation frequency of each joint shaft of robot 1 and the characteristics of the control device (see FIG. 9) for driving each joint shaft. The following Formula 1 defines a transfer function WcL until each joint shaft reaches the actual position θL after receiving the position command θc.

$$WcL = \theta L / \theta c \qquad \text{Formula 1}$$

In the following description, the position response frequency is the lower one of the following: the frequency at which the amplitude of the transfer function WcL is half (−6 dB); and the frequency at which the phase of the transfer function WcL is 90 degrees behind.

Main three shafts J1 to J3 are so physically large and heavy that it is difficult to improve the position response frequency. For example, when a robot has an arm length of 2 m and a maximum load capacity of about 10 kg, the position response frequency is at its minimum of about 5 Hz when the arm is extended (the inertia is at its maximum).

Figure 2A:
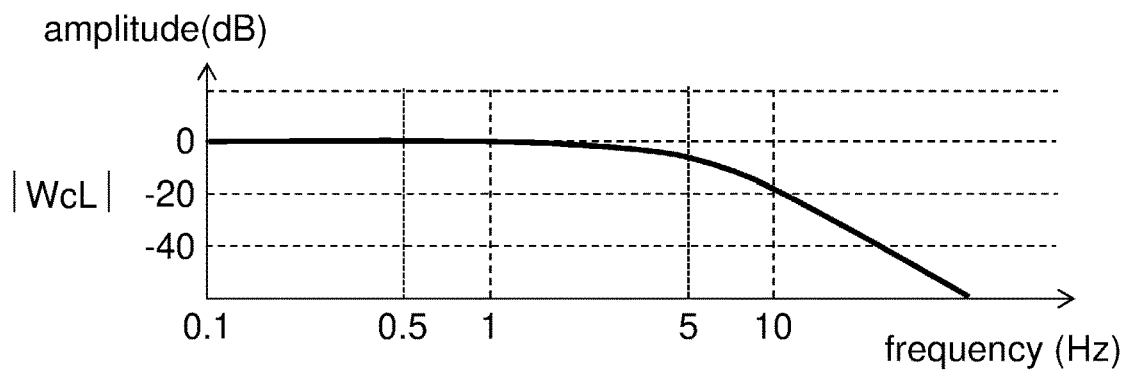
FIG. 2A shows the frequency response characteristics of the amplitude of the transfer function with respect to the operating frequency of the main shafts.
Figure 2B:
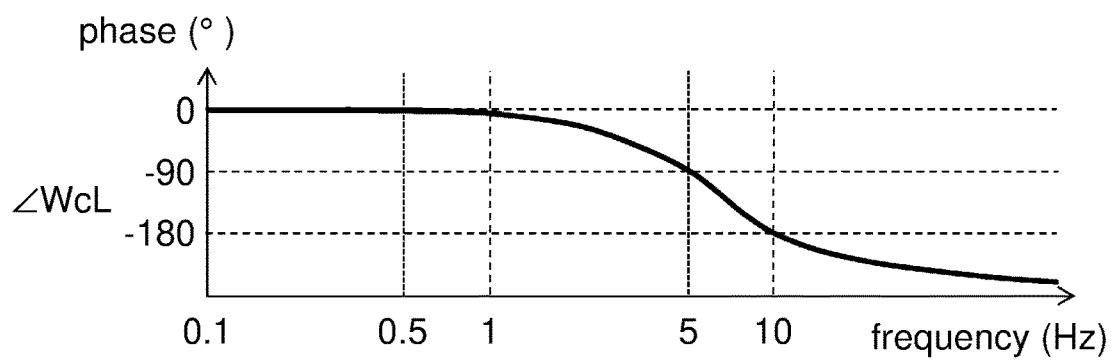
FIG. 2B shows the frequency response characteristics of the phase of the transfer function with respect to the operating frequency of the main shafts.
Figure 2C:
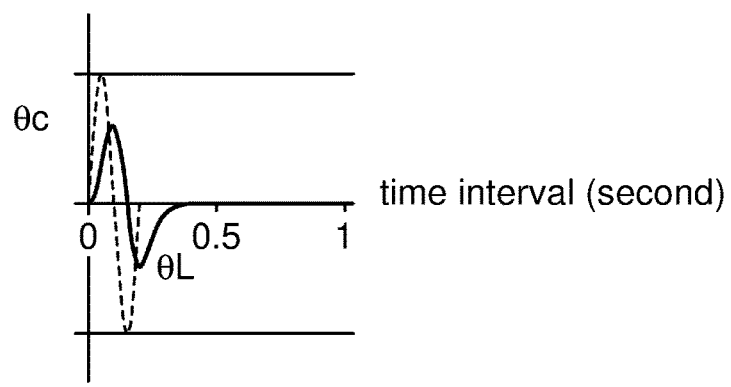
FIG. 2C shows a time waveform of a position command $\theta c$ and an actual position $\theta L$ when a sine wave of 5 Hz is applied as the position command $\theta c$ to the main shafts.

FIGS. 2A and 2B show the response characteristics of the transfer function with respect to the operating frequency of the main shafts. More specifically, FIG. 2A shows the frequency response characteristics of the amplitude of the transfer function WcL, and FIG. 2B shows the frequency response characteristics of the phase of the transfer function WcL. FIG. 2C shows a time waveform of the position command θc and the actual position θL when a sine wave of 5 Hz is applied as the position command θc to the main shafts having the frequency characteristics shown in FIGS. 2A and 2B.

As shown in FIGS. 2A and 2B, when the position response frequency is 5 Hz, the amplitude is half (−6 dB) and the phase is 90 degrees behind. Furthermore, as shown in FIG. 2C, the amplitude of the actual position θL becomes half of the position command θc, and the phase is 90 degrees behind.

Thus, when workpiece 5 is laser-cut into a circle with a diameter of 10 mm at a rate of 10 m/min by operating the main shafts at a position response frequency of 5 Hz, the diameter of the circular trajectory traced by the tip of robot arm 2 is halved, resulting in an inappropriate trajectory.

Meanwhile, distal three shafts J4 to J6 are smaller and lighter in weight than main three shafts J1 to J3. Therefore, these shafts J4 to J6 have a position response frequency of at least 10 Hz even when laser output device 3 of about 5 kg is mounted at the tip of robot arm 2. Hence, robot arm 2 can have additional joint shaft J7 at its tip. Main shafts J1 to J3 can be in the stopped state whereas distal shafts J4 to J6 and the additional joint shaft J7 together can perform positioning or track following. This operation enables robot arm 2 to have sufficient position responsivity at an operating frequency of at least 5 Hz. Thus, joint shafts J1 to J5 are brought to a complete standstill so as to keep rotation center position 8 of joint shaft J6 still.

Figure 3:
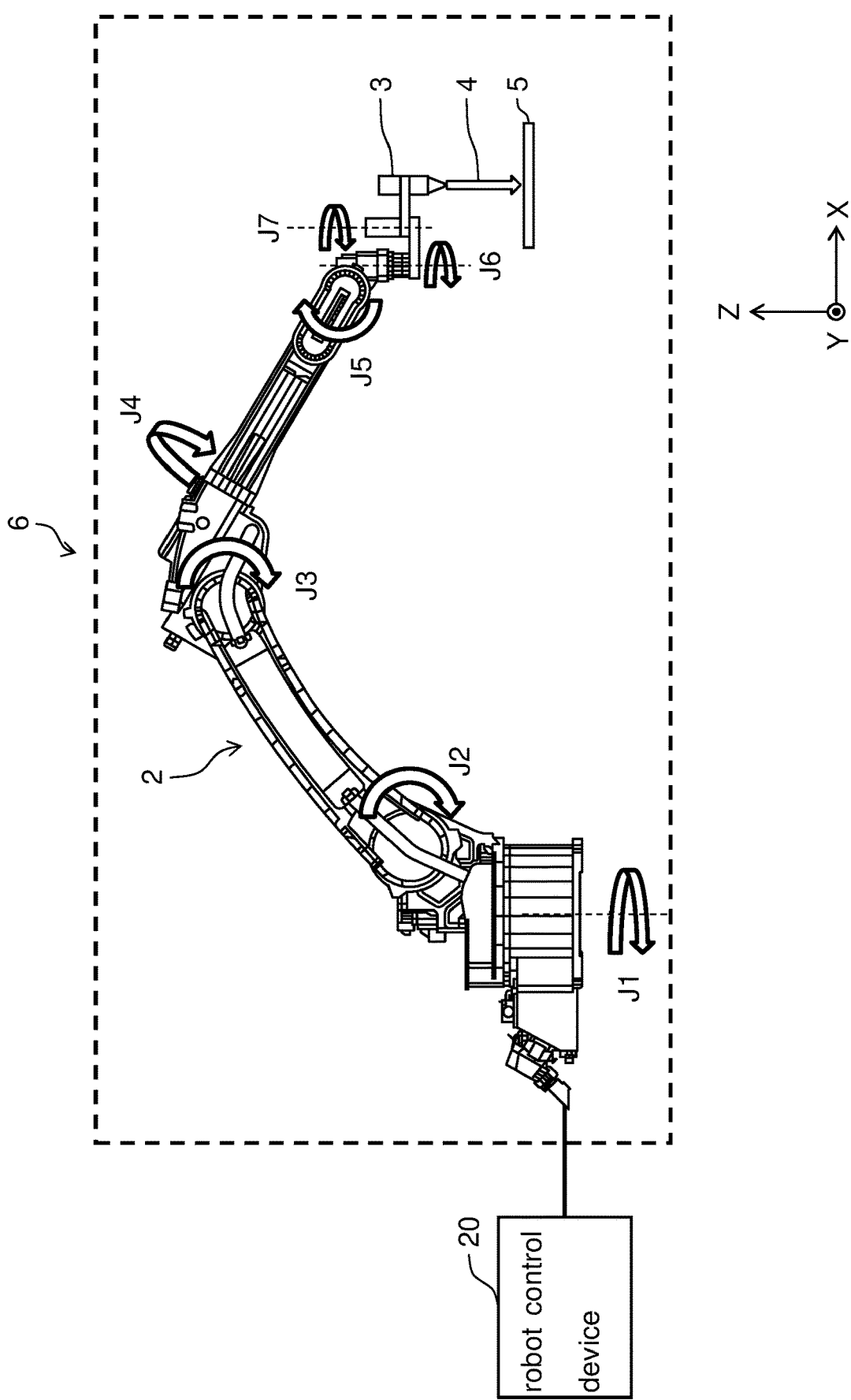
FIG. 3 shows the structure of a seven-axis vertical articulated robot in which a movable shaft has been added to the arm tip of a six-axis vertical articulated robot.

FIG. 3 shows the structure of the seven-axis vertical articulated robot in which joint shaft J7 has been added in parallel to the endmost joint shaft J6. This seven-axis vertical articulated robot 6 can move the endmost joint shafts J6 and J7 alone so as to make the tip of robot arm 2 trace a desired trajectory such as a circle or an oval.

Figure 4:
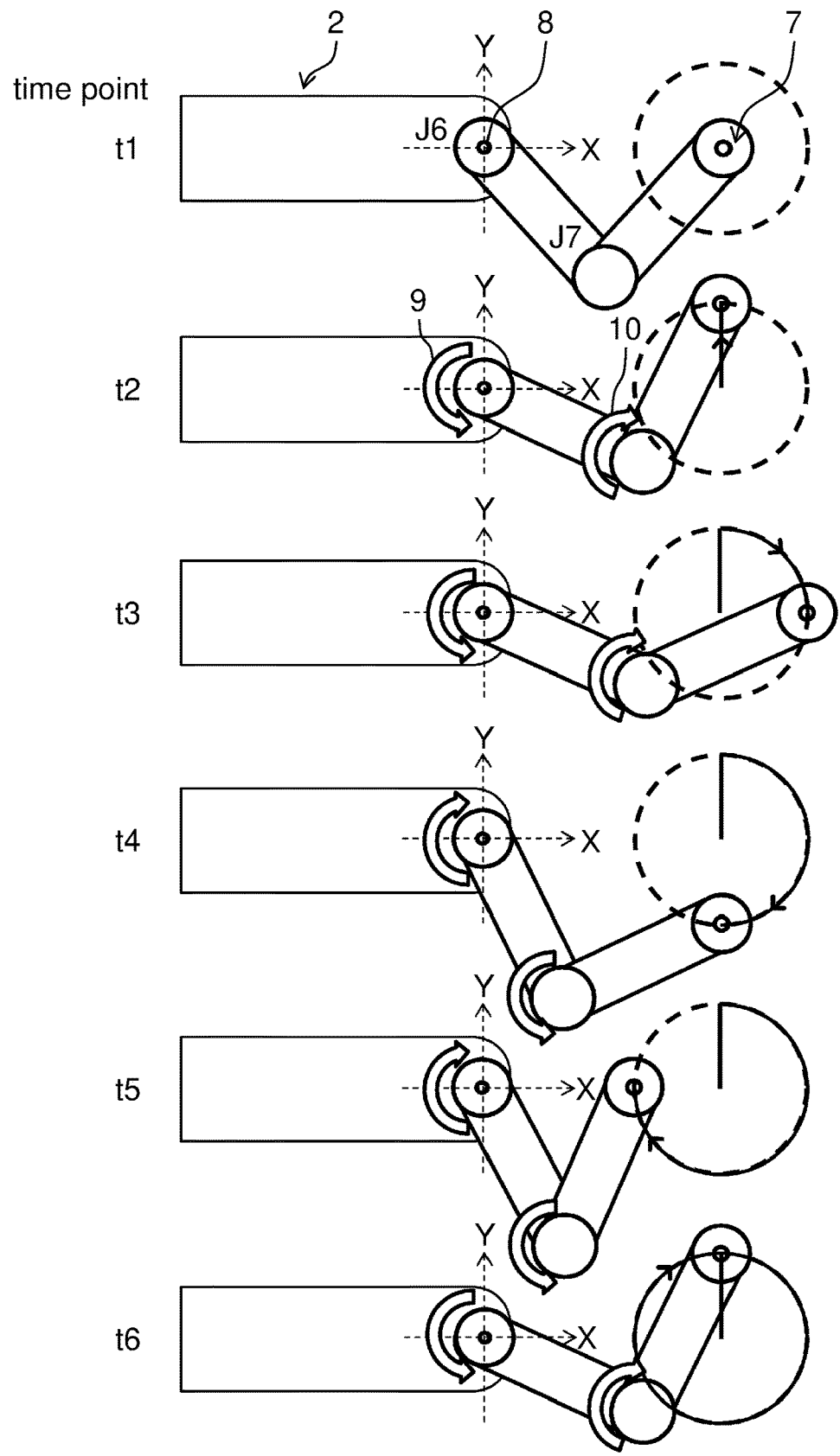
FIG. 4 shows the trajectory of the arm tip of the seven-axis vertical articulated robot shown in FIG. 3.

FIG. 4 shows the trajectory of the arm tip of robot 6 shown in FIG. 3.

At time t1, joint shafts J1 to J5 of robot arm 2 are driven to move laser radiation position 7 to the center of a desired circular trajectory, and then laser radiation is started. At time t2, laser radiation position 7 is moved in the +Y direction and placed on the circular trajectory by rotating joint shafts J6 and J7 in rotation directions 9 and 10, respectively. At times t3 to t5, joint shafts J6 and J7 are rotated so that laser radiation position 7 travels along the circular trajectory. At time t6, laser radiation is ended.

Figure 5A:
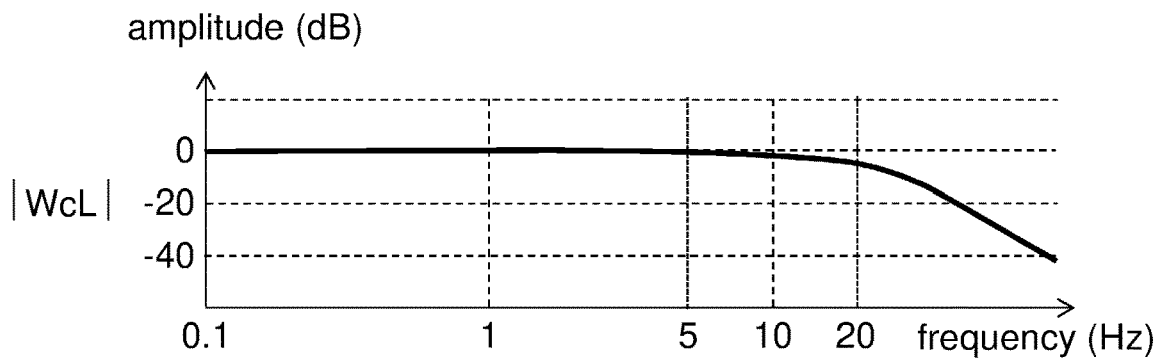
FIG. 5A shows the frequency response characteristics of the amplitude of the transfer function with respect to the operating frequency of the tip of the robot arm.
Figure 5B:
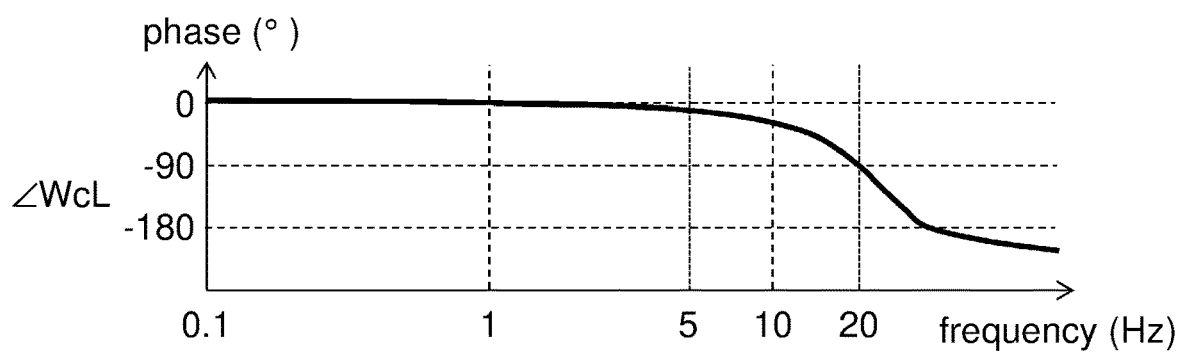
FIG. 5B shows the frequency response characteristics of the phase of the transfer function with respect to the operating frequency of the tip of the robot arm.
Figure 5C:
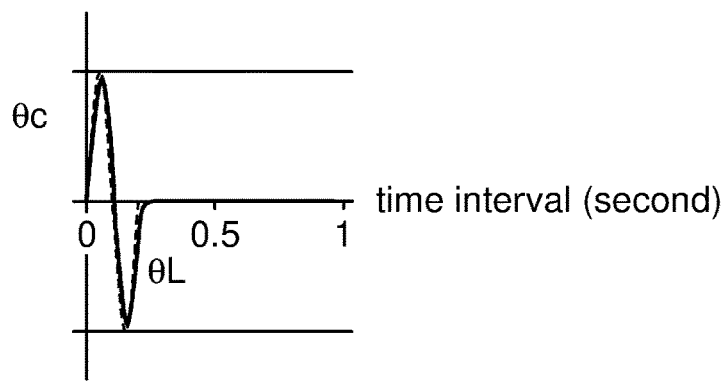
FIG. 5C shows a time waveform of the position command $\theta c$ and the actual position $\theta L$ when a sine wave of 5 Hz is applied as the position command $\theta c$ to the tip of the robot arm.

FIGS. 5A and 5B show the response characteristics of the transfer function with respect to the operating frequency of the robot arm tip. More specifically, FIG. 5A shows the frequency response characteristics of the amplitude of the transfer function WcL, and FIG. 5B shows the frequency response characteristics of the phase of the transfer function WcL. In FIGS. 5A and 5B, the robot arm tip indicates joint shafts J6 and J7, respectively. FIG. 5C shows a time waveform of the position command θc and the actual position θL when a sine wave of 5 Hz is applied as the position command θc to the robot arm having the frequency characteristics shown in FIGS. 5A and 5B. Since joint shafts J6 and J7 are smaller and lighter in weight than the main shafts as mentioned earlier, the position response frequency of these shafts J6 and J7 is, for example, about 20 Hz, which is higher than that of the main shafts.

Therefore, as shown in FIGS. 5A and 5B, when the position response frequency is 20 Hz, the amplitude is half (−6 dB), and the phase is 90 degrees behind. As shown in FIG. 5C, when the frequency of the position command θc is 5 hz, the actual position θL does not have a substantial amplitude attenuation or phase delay. Thus, the actual position θL follows the position command θc better than in the case shown in FIG. 2C.

In the case shown in FIG. 5C, when workpiece 5 is laser-cut into a circle with a diameter of 10 mm at a rate of 10 m/min, the tip of robot arm 2 can draw a circular trajectory approximately as commanded as shown in FIG. 4.

The Generation and Influence of the Interference Torque Due to the Movement of the Joint Shafts of the Robot Arm However, the movement of joint shafts J6 and J7 causes an interference torque on joint shafts J1 to J5, thereby bending the reduction gears connected to joint shafts J1 to J5. The rotational trajectories of main three shafts J1 to J3 are particularly far from the tip of robot arm 2. The inventors of the present application have found that a slight bending of the reduction gears connected to these joint shafts can cause rotation center position 8 of joint shaft J6 to greatly fluctuate, thereby greatly affecting the trajectory drawn by the tip of robot arm 2.

The inventors of the present application have actually investigated the fluctuation of rotation center position 8 of joint shaft J6 when workpiece 5 is laser-cut into a circle with a diameter of 10 mm at a rate of 10 m/min. This investigation has revealed that joint shaft J6 has a fluctuation of about 1 mm, causing the trajectory drawn by the tip of robot arm 2 to have an error of 10% or so. In seven-axis vertical articulated robot 6 shown in FIG. 3, the characteristics of the reduction gears are different from one joint shaft to another. Therefore, the amount of bending differs from one reduction gear to another, thereby causing rotation center position 8 of joint shaft J6 to fluctuate irregularly.

Figure 6:
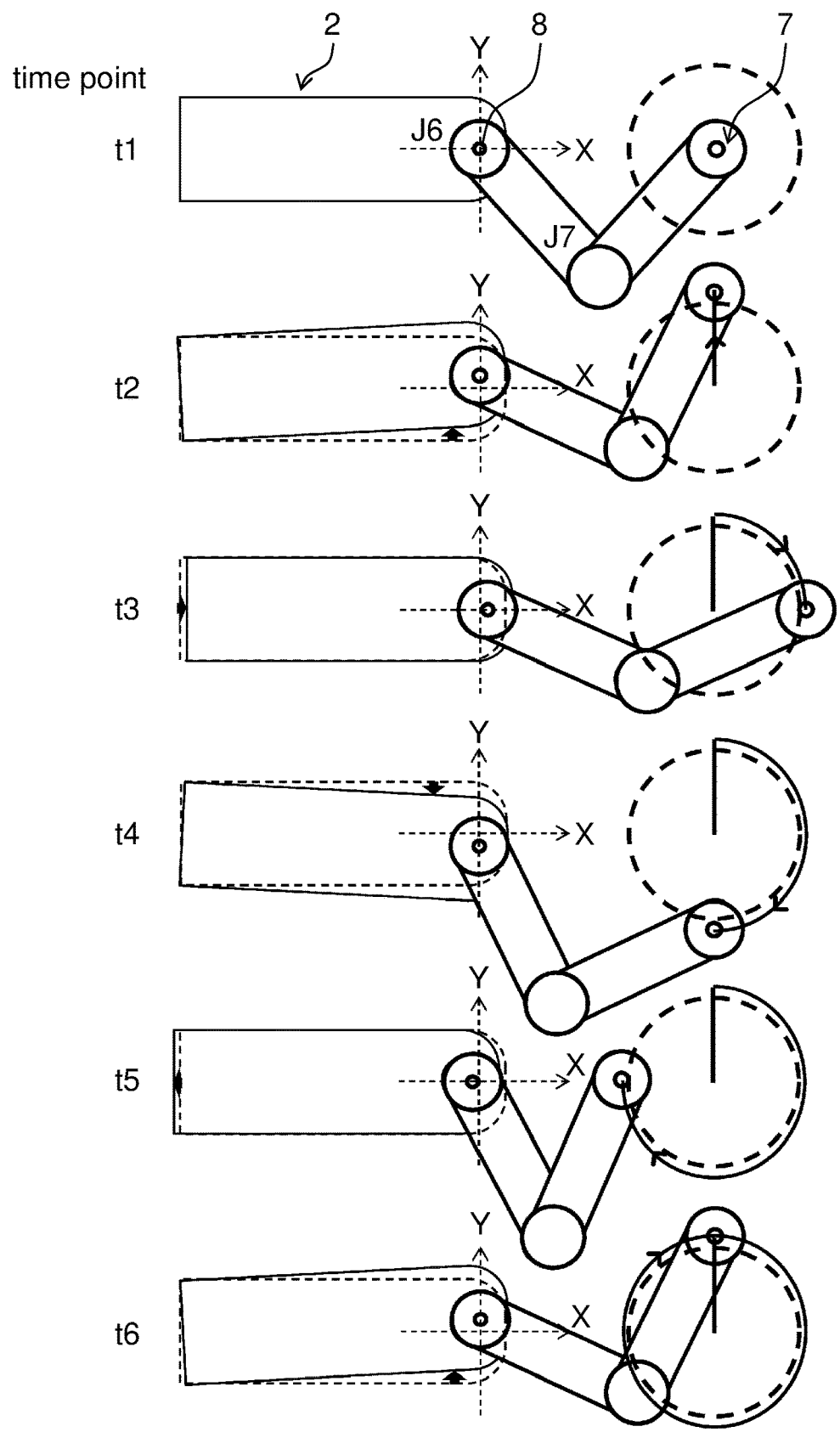
FIG. 6 shows the trajectory of the arm tip of the seven-axis vertical articulated robot when the reduction gear is bent.

FIG. 6 shows the trajectory of the arm tip of seven-axis vertical articulated robot 6 when the reduction gears are bent.

At time t1, joint shafts J1 to J5 of robot arm 2 are driven to move laser radiation position 7 to the center of a desired circular trajectory, and then laser radiation is started. Similar to the case shown in FIG. 4, at time t2, laser radiation position 7 is moved in the +Y direction so that the tip of robot arm 2 is placed on the circular trajectory by rotating joint shafts J6 and J7. However, the interference torque due to the movement of joint shafts J6 and J7 bends mainly the reduction gear of joint shaft J1, thereby causing rotation center position 8 of joint shaft J6 to deviate in the +Y direction. At time t3, laser radiation position 7 is traveled in the +X direction along the circular trajectory. The interference torque bends mainly the reduction gear of joint shaft J2, thereby causing rotation center position 8 of joint shaft J6 to deviate in the +X direction. However, the difference in the amount of bending between the reduction gears connected to joint shafts J1 and J2 roughly halves the amount of the position error in the +X direction of the rotation center position 8 of joint shaft J6, compared with the amount of the position error in the +Y direction. Also at each of times t3 to t5, the interference torque causes a position error in rotation center position 8 of joint shaft J6. As a result, while the position command θc has a circular trajectory, the actual position θL has an oval trajectory.

When main three shafts J1 to J3 are moved in a six-axis articulated robot, the diameter of the circular trajectory may be reduced about 50% by an error. The trajectory error of the actual position θL is smaller than this error, but it exceeds the maximum error allowable when processing is performed with a robot. Therefore, some measures should be taken for this.

Figure 7:
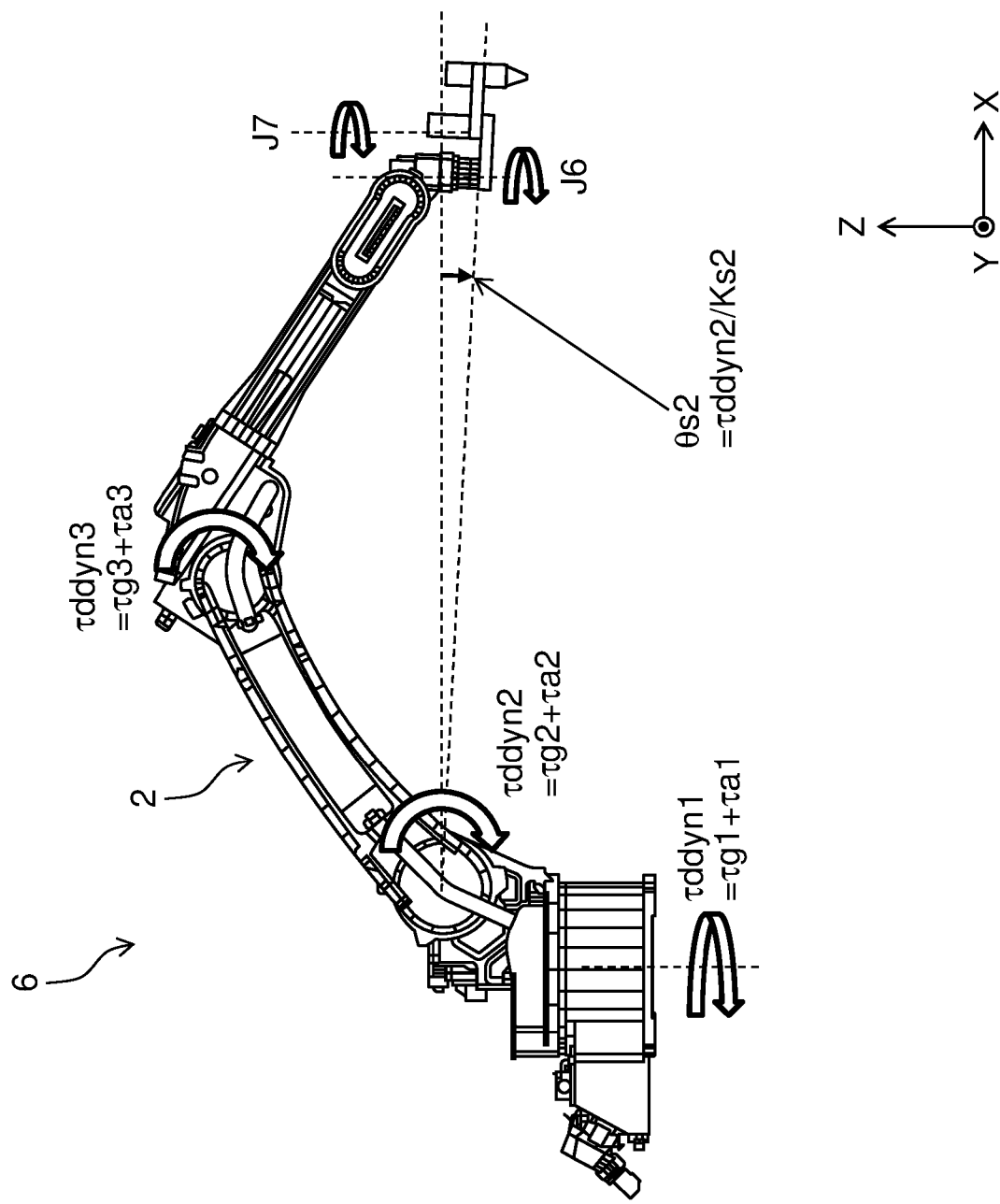
FIG. 7 shows a diagram of the position error of the robot arm tip due to the external torque.

FIG. 7 shows a diagram of the position error of the robot arm tip due to the external torque. Main three shafts J1 to J3 are subjected to external torques τddyn1, τddyn2, and τddyn3, respectively, which are the sum of the gravitational and interference torques: (τtg1+τa1), (τg2+τa2), and (τg3+τa3), respectively. For convenience of explanation, FIG. 7 only shows the bending amount θs2 of joint shaft J2.

In this case, the bending correction value θsc (hereinafter, position-command correction value) to be added to the position command θc is expressed by the following Formula 2 where Ks represents the spring constant of the reduction gear.

$$\theta sc = -\theta s = -\tau ddyn/Ks \qquad \text{Formula 2}$$

where θs represents the amount of bending caused between the later-described primary and secondary sides of the reduction gear.

The bending correction value θsgc (hereinafter, first position-command correction value) to reduce a gravitational torque τg and the bending correction value θsgc to reduce interference torque τa are expressed by the following Formulas 3 and 4, respectively.

$$\theta sgc = -\tau g/Ks \quad \text{Formula 3}$$

$$\theta sac = -\tau a/Ks \quad \text{Formula 4}$$

Consequently, the entire position-command correction value θsc is as shown in Formula 5.

$$\theta sc = -(\tau g + \tau a)/Ks = \theta sgc + \tau sac \quad \text{Formula 5}$$

When the position-command correction value θsc expressed by Formula 5 is added to the position command θc to perform bending correction, the first position-command correction value θsgc to reduce the gravitational torque τg is fully corrected for the following reason.

While main three shafts J1 to J3 are in the stopped state, the gravitational torque τg has a frequency of 0 Hz. The robot has an arm length of 2 m and a maximum load capacity of about 10 kg, whereas main three shafts J1 to J3 have an operational angular velocity of about 180/sec. and rotate only half of the circle per second. Therefore, even when main three shafts J1 to J3 are in action, the gravitational torque τg changes less than 0.5 Hz.

Consequently, the oscillation frequency of robot arm 2 twisted by the gravitational torque τg is also less than 0.5 Hz. Even when the position response frequency of main three shafts J1 to J3 is 5 Hz or so, the actual position θL can fully follow the position command θc, achieving bending correction.

Meanwhile, the bending due to the interference torque τa cannot be fully corrected even when the bending correction value θsac to reduce the interference torque τa is added to the position command θc for the following reason.

In the above-described cutting operation (workpiece 5 is cut into a circle with a diameter of 10 mm at a rate of 10 m/min), the center frequency of the bending of robot arm 2 due to the interference torque τa is 5 Hz. As a result, as shown in Formula 4, the frequency of the bending correction value θsac to reduce the interference torque τa is also 5 Hz.

Figure 8A:
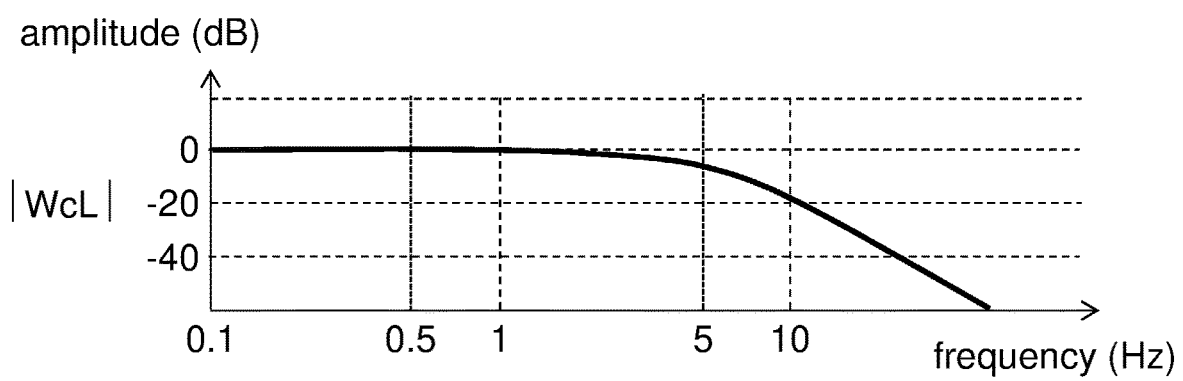
FIG. 8A shows the frequency response characteristics of the amplitude of the transfer function with respect to the operating frequency of the main shafts when the reduction gear is bent.
Figure 8B:
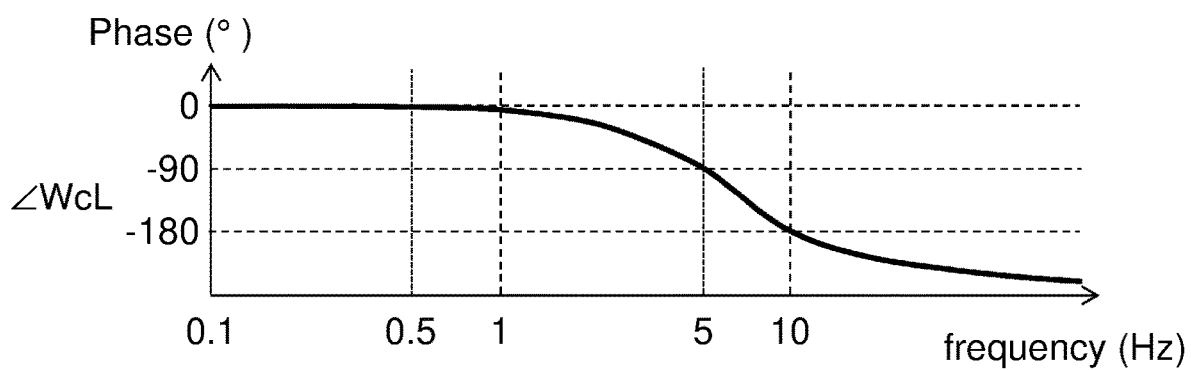
FIG. 8B shows the frequency response characteristics of the phase of the transfer function with respect to the operating frequency of the main shafts when the reduction gear is bent.
Figure 8C:
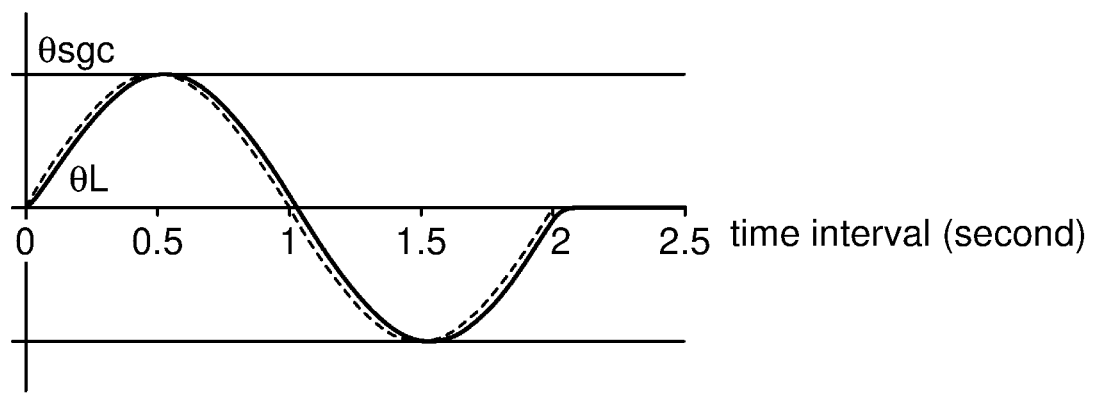
FIG. 8C shows a time waveform of the position command $\theta c$ and the actual position $\theta L$ when a sine wave of 0.5 Hz is applied as the position command $\theta c$ to the main shafts.
Figure 8D:
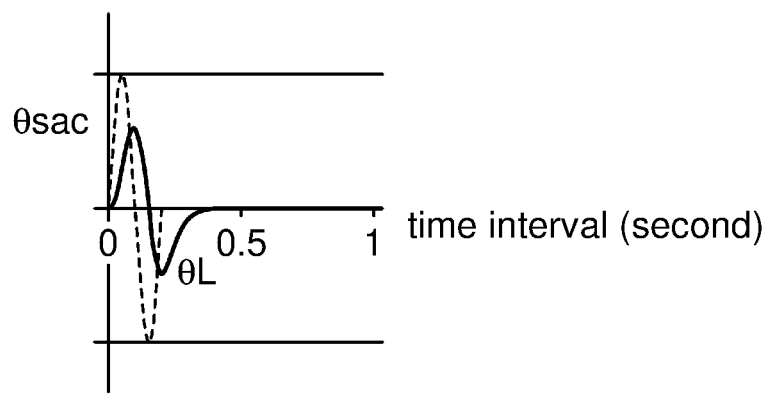
FIG. 8D shows a time waveform of the position command $\theta c$ and the actual position $\theta L$ when a sine wave of 5 Hz is applied as the position command $\theta c$ to the main shafts.

FIGS. 8A and 8B show the response characteristics of the transfer function with respect to the operating frequency of the main shafts when the reduction gears are bent. More specifically, FIG. 8A shows the frequency response characteristics of the amplitude of the transfer function WcL, and FIG. 8B shows the frequency response characteristics of the phase of the transfer function WcL. FIG. 8C shows a time waveform of the position command θc and the actual position θL when a sine wave of 0.5 Hz is applied as the position command θc to the main shafts having the frequency characteristics shown in FIGS. 2A and 2B. FIG. 8D shows a time waveform of the position command θc and the actual position θL when a sine wave of 5 Hz is applied as the position command θc to the main shafts.

As shown in FIG. 8C, the actual position θL fully follows the first position-command correction value θsgc, which has a frequency of 0.5 Hz. Meanwhile, as shown in FIG. 8D, the amplitude of the actual position θL is half as high as that of the bending correction value θsac to reduce the interference torque τa, and the phase of the actual position θL is 90 degrees behind.

In the above-described well-known approach, the position-command correction value θsc is found based on the external torque τddyn as a whole without dividing it into the gravitational torque and the interference torque. Therefore, for example, if the position-command correction value θsc is increased with a decrease in the actual corrected amplitude of the bending due to the interference torque τa, the first position-command correction value θsgc to reduce the gravitational torque τg is also increased. As a result, the arm is raised more than it is pulled down by gravitation.

The inventors of the present application have found that the external torque can be separated into the gravitational torque and the interference torque so as to correct the position error of robot arm 2 based on these separate torques, thereby enabling robot arm 2 to provide a desired trajectory. This finding will be described in detail as follows.

First Exemplary Embodiment

Articulated Robot and the Structure of its Control System

Figure 9:
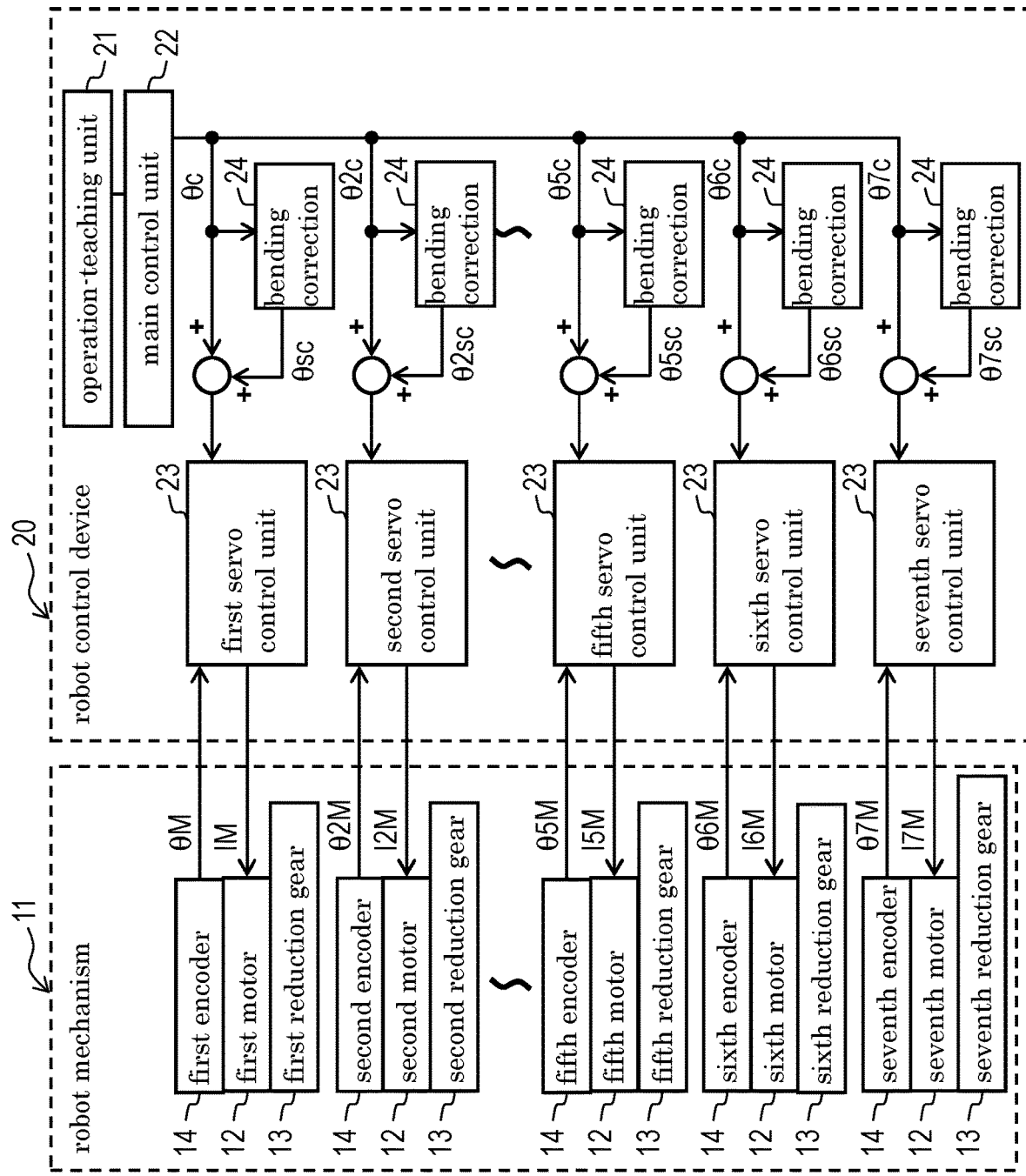
FIG. 9 shows a functional block diagram of the position control of the seven-axis vertical articulated robot shown in FIG. 3.

FIG. 9 shows a functional block diagram of the position control of seven-axis vertical articulated robot 6 shown in FIG. 3. This diagram includes a schematic internal structure of the robot mechanism and the robot control device. Robot mechanism 11 is a mechanical drive unit of robot 6 and includes servo motors 12 (hereinafter, motors), reduction gears 13, and encoders 14. Although not illustrated, robot mechanism 11 includes robot arm 2. Motors 12 are connected to joint shafts J1 to J7 of robot 6 shown in FIG. 3 through respective reduction gears 13. Motors 12 drive joint shafts J1 to J7 to control the operation and attitude of robot arm 2 according to the control signal from servo control units 23 of robot control device 20. Encoders 14, which are connected to motors 12, detect their amount and speed of rotation and send the detection signals as feedback signals to respective servo control units 23.

In the following description, motor 12, reduction gear 13, and encoder 14 connected to joint shaft J1 may hereinafter be referred to as the first motor, the first reduction gear, and the first encoder, respectively. Similarly, the motors connected to joint shafts J2 to J7 may hereinafter be referred to as second-to-seventh motors. Servo control unit 23 and bending correction block 24 connected to the first motor may hereinafter be referred to as the first servo control unit and the first bending correction block, respectively. Similarly, servo control units 23 connected to the second-to-seventh motors may hereinafter be referred to as the second-to-seventh servo control units. Bending correction blocks 24 connected to the second-to-seventh servo control units may hereinafter be referred to as second to fifth bending correction blocks. The position commands and the position-command correction values sent to the joint shafts may hereinafter be referred to as the position commands θc to θ7c, and the position-command correction values θsc to θ7sc, respectively.

Robot control device 20 includes operation-teaching unit 21, main control unit 22, servo control units 23, and bending correction blocks 24 (bending correction means). Operation-teaching unit 21 stores the trajectory of robot arm 2 acquired in the teaching process and the rotation of motors 12 to draw the trajectory.

Main control unit 22 receives an instruction from operation-teaching unit 21, and outputs the position commands θc to θ7c to joint shafts J1 to J7, respectively, of robot 6 according to the trajectory of robot arm 2 of robot mechanism 11 stored in operation-teaching unit 21.

First-to-seventh servo control units 23 control the rotation of first-to-seventh motors 12 of robot mechanism 11 such that the actual position θL follows the position commands θc to θ7c sent from main control unit 22.

Bending correction blocks 24 are located between main control unit 22 and the respective servo control units 23 in such a manner as to correspond to joint shafts J1 to J7. Bending correction blocks 24 generate the position-command correction values θsc to θ7sc based on the position commands θc to θ7c received from main control unit 22. The position-command correction values θsc to θ7sc thus generated are added to the position commands θc to θ7c, respectively, and are sent to first-to-seventh servo control units 23, respectively.

Each functional block in robot control device 20 may be composed of an independent circuit, or of a single integrated circuit. Alternatively, a combination of some functional blocks may be composed of a single integrated circuit. The functions of main control unit 22, servo control units 23 and bending correction blocks 24 are achieved mostly by executing a software program on an integrated circuit such as a CPU.

Figure 10:
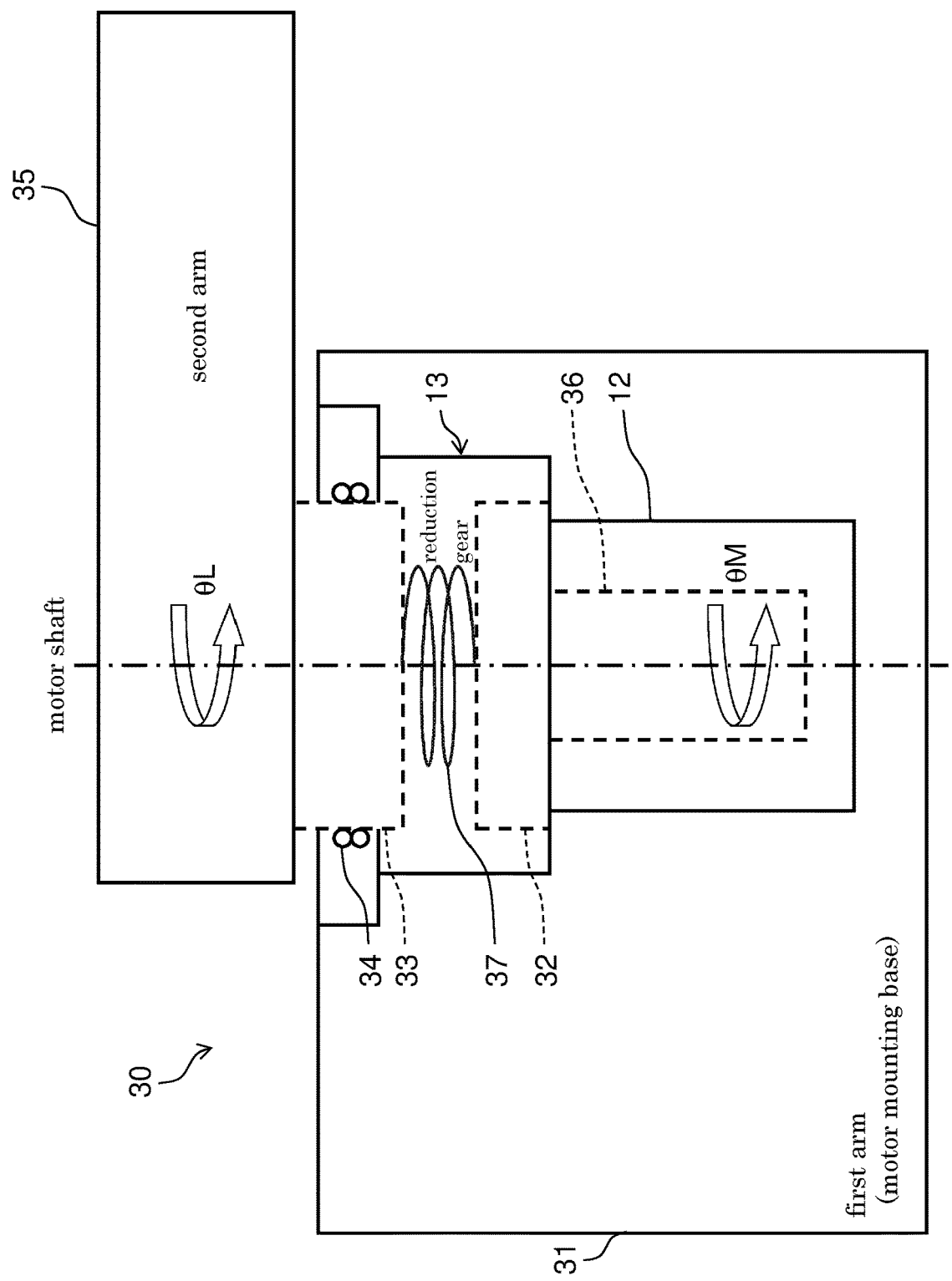
FIG. 10 is a diagram showing the bending of the reduction gears in the robot mechanism.

FIG. 10 is a diagram showing the bending of the reduction gears in the robot mechanism. As shown in FIG. 10, motor 12, reduction gear 13, and part of robot arm 2 coupled with them are extracted as load 30 from robot mechanism 11. Load 30 includes the following: first arm 31 as a motor mounting base; motor 12 connected to arm 31; reduction gear 13 having: primary side 32 connected to motor 12, and secondary side 33 including bearing 34; and second arm 35 rotatably connected to secondary side 33.

Primary side 32 of the reduction gear is connected to rotor 36 of motor 12 through the shaft of motor 12. Primary side 32 is rotated by the angle corresponding to a motor rotation position θM sent from servo control unit 23. Reduction gear 13 converts the motor rotation position θM into the arm rotation position (actual position) θL at a reduction ratio Rg shown in Formula 6.

$$Rg = \theta M / \theta L \qquad \text{Formula 6}$$

However, as shown in FIG. 10, reduction gear 13 includes spring component 37 between primary side 32 and secondary side 33, so that Formula 6 is satisfied only when the stretch of the spring, or the bending, is constant.

Figure 11:
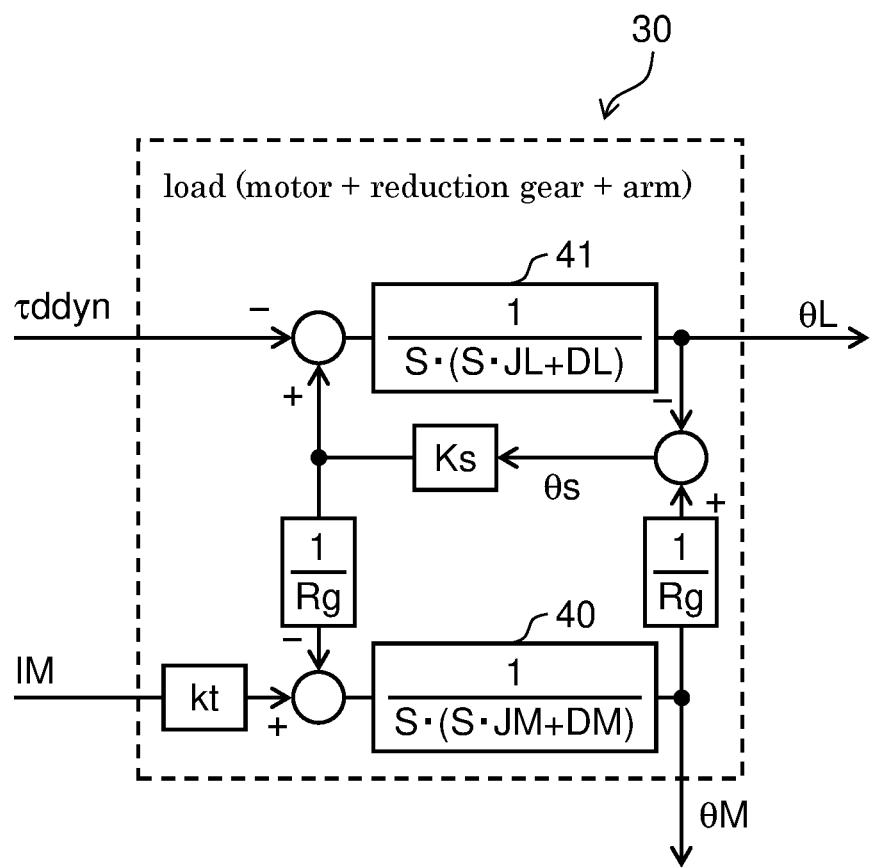
FIG. 11 is a block diagram of the load shown in FIG. 10.

FIG. 11 is a block diagram of the load shown in FIG. 10. The diagram includes the following: a motor current command IM to drive motor 12; a torque constant Kt of motor 12; the reciprocal 1/Rg of the reduction ratio shown in Formula 6; the spring constant Ks of reduction gear 13; the amount of bending θs caused between primary side 32 and secondary side 33 of the reduction gear; and an external torque τddyn applied to robot arm 2. Note that motor 12 is supplied with a current evoked by motor current command IM.

Motor transfer function 40 has: a moment of inertia JM around the shaft including rotor 36 of motor 12 and primary side 32 of the reduction gear; and a viscous friction coefficient DM. Load transfer function 41 has: a moment of inertia JL around the shaft including second arm 35 and secondary side 33 of the reduction gear; and a viscous friction coefficient DL.

As shown in FIG. 11, the motor rotation position θM is obtained based on the motor current command IM. The motor rotation position θM is multiplied by the reciprocal 1/Rg of the reduction ratio so as to obtain a first value. Meanwhile, the arm rotation position θL is obtained based on the external torque τddyn. The arm rotation position θL is subtracted from the first value so as to calculate the bending amount θs generated between primary side 32 and secondary side 33 of the reduction gear. The bending amount θs thus obtained is multiplied by the spring constant Ks so as to obtain a second value. The second value is added to the external torque τddyn. The second value is also multiplied by the reciprocal 1/Rg of the reduction ratio so as to obtain a third value. The third value is subtracted from the product of the motor current command IM and the torque constant Kt of motor 12.

Since FIG. 11 shows a typical control block diagram of a motor connected to a load and a reduction gear, the remaining functions will not be described in detail.

The Detailed Structure of the Control Block of the Articulated Robot

Figure 12:
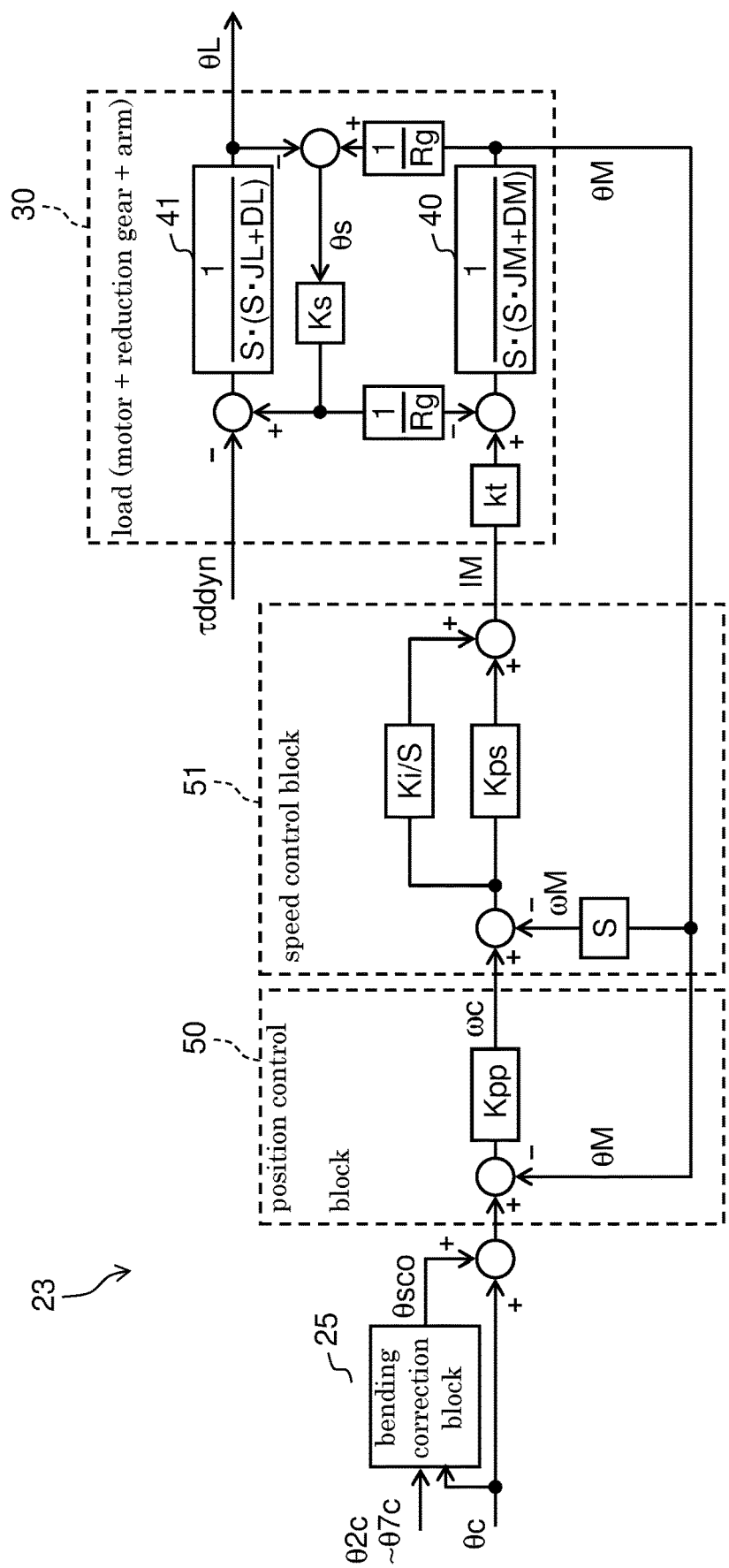
FIG. 12 is a block diagram of the first servo control unit for comparison.

FIG. 12 is a block diagram of the first servo control unit for comparison with FIG. 11. In servo control unit 23, position control block 50 receives a fourth value, which is obtained by adding a position command θc and a bending correction value θsco (also referred to as position-command correction value Osco) sent from bending correction block 24. The motor rotation position θM is subtracted from the fourth value so as to obtain a fifth value. The fifth value is multiplied by a position proportional gain Kpp so as to generate a speed command ωc. The motor rotation position θM is obtained from a detection signal of first encoder 14, which is a position detector. The following description will be focused on the structure of first servo control unit 23, but the description holds true for the structure of the second-to-seventh servo control units 23.

In speed control block 51, the motor rotation position θM is differentiated to obtain a motor speed ωM. The motor speed ωM is subtracted from the speed command ωc so as to obtain a sixth value. The sixth value is multiplied by a velocity proportional gain Kps so as to obtain a seventh value. The sixth value is also integrated and multiplied by a velocity integral gain Ki so as to obtain an eighth value. The seventh and eighth values are added together to calculate the current to be supplied to first motor 12, thereby obtaining the motor current command IM.

Figure 13:
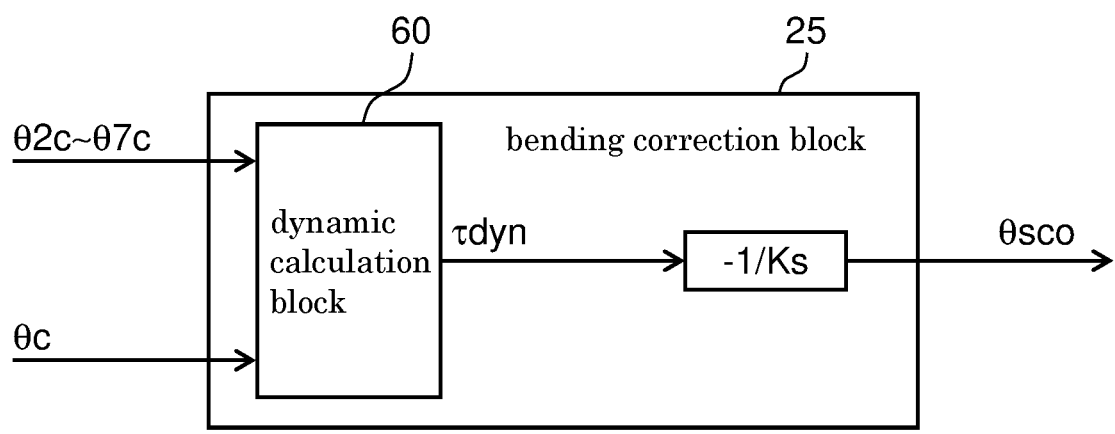
FIG. 13 is a block diagram of the bending correction block shown in FIG. 12.

FIG. 13 shows a detailed structure of the bending correction block shown in FIG. 12. Bending correction block 25 includes dynamic calculation block 60. As shown in Formula 2, finding the position-command correction value θsco requires finding the external torque τddyn in advance. However, attaching a torque sensor to each joint shaft to find the external torque τddyn is not preferable because torque sensors are generally expensive. Moreover, attaching a torque sensor to each joint shaft causes robot arm 2 to bend more.

To avoid this happening, dynamic calculation block 60 finds an external torque value τdyn by using the position commands θc to θ7c sent from main control unit 22 for all the joint shafts. In dynamic calculation block 60, dynamic calculation is performed using the position commands θc to θ7c for all the shafts, the speed components, which are the differential values of the position commands θc to θ7c, and the acceleration components, which are second-order differential values. This calculation finds the external torque applied to each joint shaft.

The external torque value τdyn is multiplied by the reciprocal of the spring constant Ks (obtained by sign inversion) so as to find the position-command correction value θsco.

$$\theta sco = \tau dyn \times (-1/Ks) \qquad \text{Formula 7}$$

As described earlier, the external torque value τdyn contains both the gravitational torque τg and the interference torque τa. Therefore, the actual corrected amplitude of the bending due to the interference torque τa having a high frequency is small. If the position-command correction value θsco is increased accordingly, the position-command correction value to reduce the gravitational torque τg is also increased. The arm is raised more than it is pulled down by gravitation as described earlier.

Figure 14:
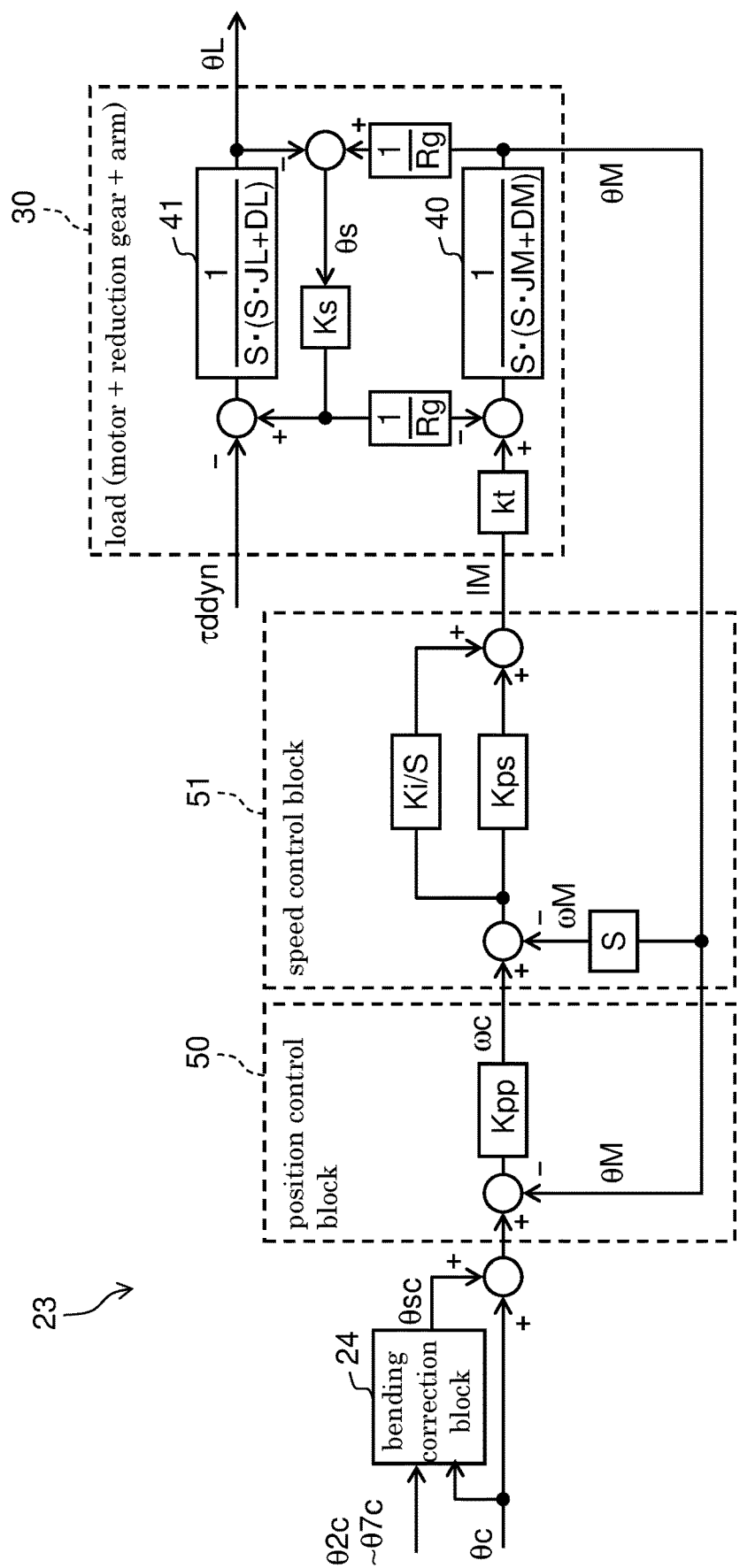
FIG. 14 is a block diagram of the first servo control unit in a first exemplary embodiment of the present disclosure.
Figure 15:
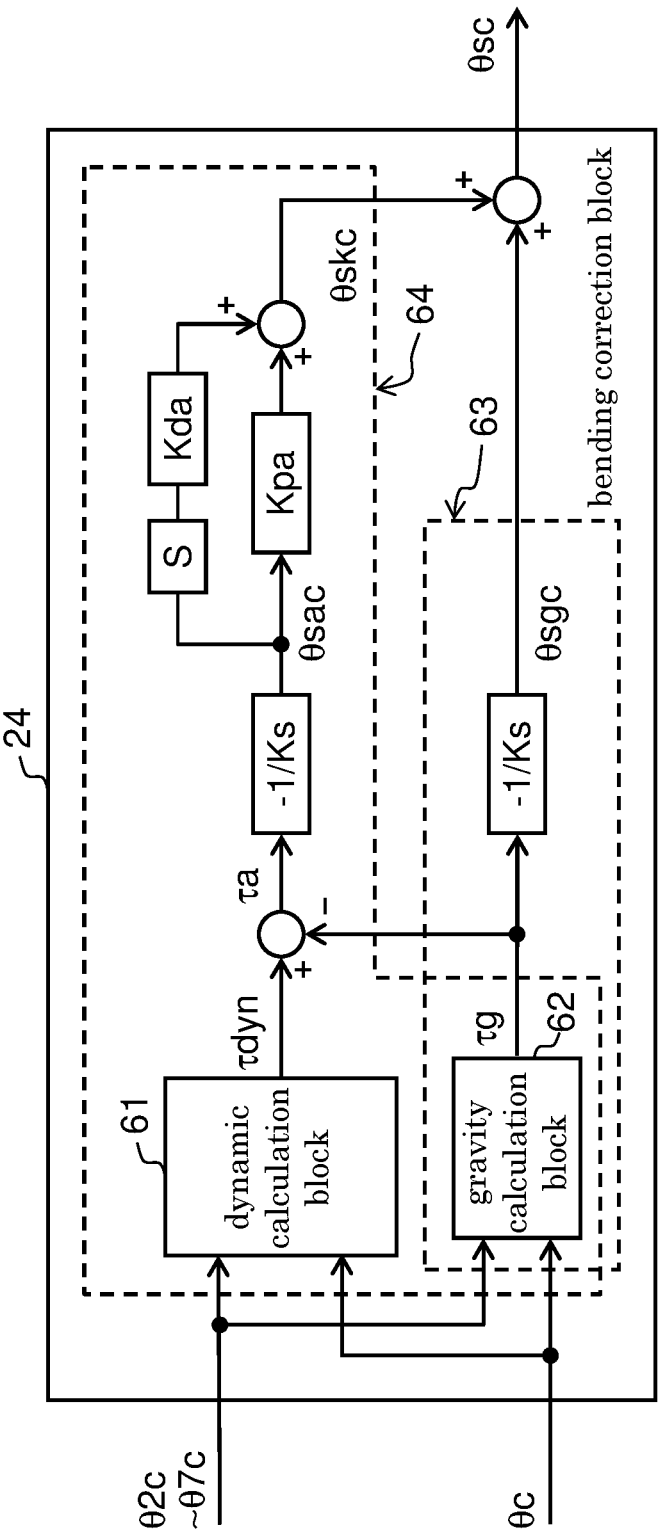
FIG. 15 is a block diagram of the bending correction block shown in FIG. 14.

FIG. 14 is a block diagram of the first servo control unit in the present exemplary embodiment. In first servo control unit 23, the functional blocks except bending correction block 24 are the same as those shown in FIG. 12, so that their description is not be repeated here. FIG. 15 shows the detailed structure of bending correction block 24 shown in FIG. 14. Bending correction block 24 (bending correction means) includes dynamic calculation block 61 and gravity calculation block 62. Block 61 finds the external torque value τdyn using the position commands θc to θ7c sent from main control unit 22 to all the joint shafts. The external torque applied to each joint shaft in dynamic calculation block 61 is calculated in the same manner as that shown for comparison. To be more specific, when the number of the joint shafts is n (n is an integer not less than 2), one bending correction block 24 receives n position commands θc to θnc corresponding to the n servo motors 12 sent from main control unit 22 and correct the position error of robot arm 2, which is caused by the bending of reduction gears 13, based on these position commands.

Meanwhile, in the present exemplary embodiment, each bending correction block 24 separates the gravitational torque τg and interference torque τa from each other to calculate the respective position-command correction values. Gravity calculation block 62 receives the position commands θc to θ7c in the same manner as dynamic calculation block 61. Block 62 finds the gravitational torque τg through dynamic calculation with the above-mentioned speed and acceleration components set at zero.

The gravitational torque τg is subtracted from the external torque value τdyn so as to obtain the interference torque τa as shown in Formula 8.

$$\tau a = \tau dyn - \tau g \quad \text{Formula 8}$$

As described above, in the present exemplary embodiment, each of the external torque value τdyn, the gravitational torque τg, and the interference torque τa is calculated in bending correction block 24.

Furthermore, the gravitational torque τg thus obtained is used to obtain the first position-command correction value θsgc from Formula 9.

$$\theta sgc = \tau g \times (-1/Ks) \quad \text{Formula 9}$$

Meanwhile, the bending correction value θsac to reduce the interference torque τa is calculated by Formula 10 shown below.

$$\theta sac = \tau a \times (-1/Ks) \quad \text{Formula 10}$$

As mentioned earlier, the amplitude and phase of the bending correction value θsac should be compensated to correspond to the actual position θL. For example, they should be subjected to PD compensation including proportion comprehension and phase lead compensation. The value θskc (hereinafter, second position-command correction value) obtained by the compensation is shown in Formula 11.

$$\theta skc = Kpa \times \theta sac + Kda \times (s \cdot \theta sac) \quad \text{Formula 11}$$

where Kpa represents a PD compensation proportional gain and a coefficient for amplitude compensation; Kda represents a PD compensation differential gain and a coefficient for phase compensation; and s represents an integral component.

The position-command correction value θsc is obtained from the values calculated by Formula 9 and Formula 11.

$$\theta sc = \theta sgc + \theta skc \quad \text{Formula 12}$$

Gravity calculation block 62 and the calculate function of bending correction block 24, which is shown in Formula 9, will be together referred to as first position-command-correction-value calculation means 63. Dynamic calculation block 61, gravity calculation block 62, and the calculate function of bending correction block 24, which is shown in Formulas 8, 10 and 11, will be together referred to as second position-command-correction-value calculation means 64.

As shown in FIG. 14, first servo control unit 23 receives a new position command (θc+θsc) obtained by adding the position-command correction value θsc shown in Formula 12 to the position command θc sent from main control unit 22 to first servo control unit 23. First servo control unit 23 uses the new position command to control the driving of first motor 12.

Figure 16A:
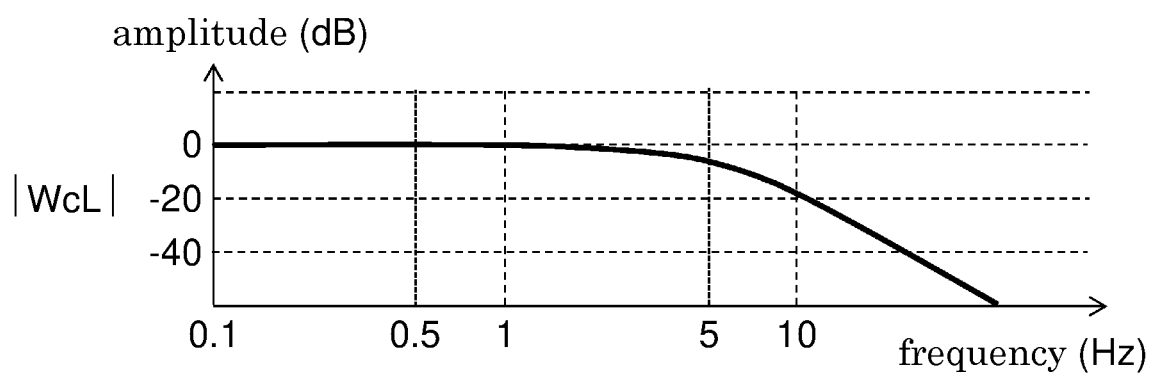
FIG. 16A shows the frequency response characteristics of the amplitude of the transfer function with respect to the operating frequency of the main shafts in the first exemplary embodiment.
Figure 16B:
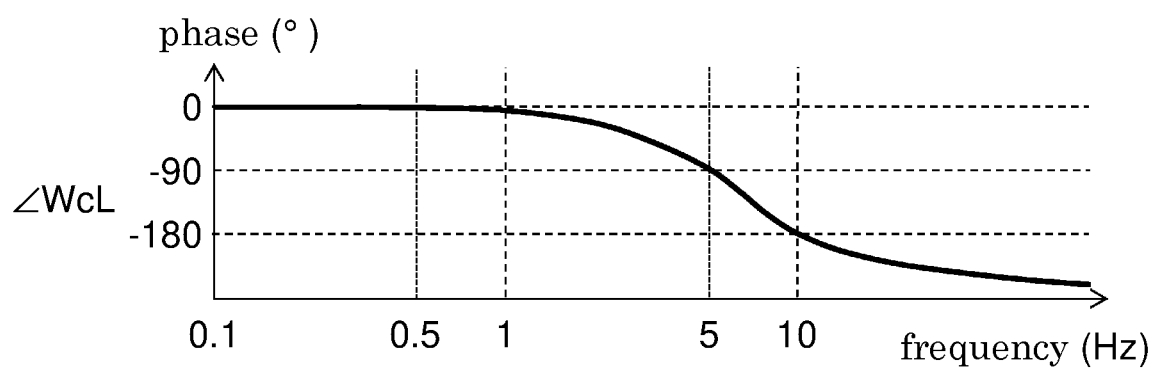
FIG. 16B shows the frequency response characteristics of the phase of the transfer function with respect to the operating frequency of the main shafts in the first exemplary embodiment.
Figure 16C:
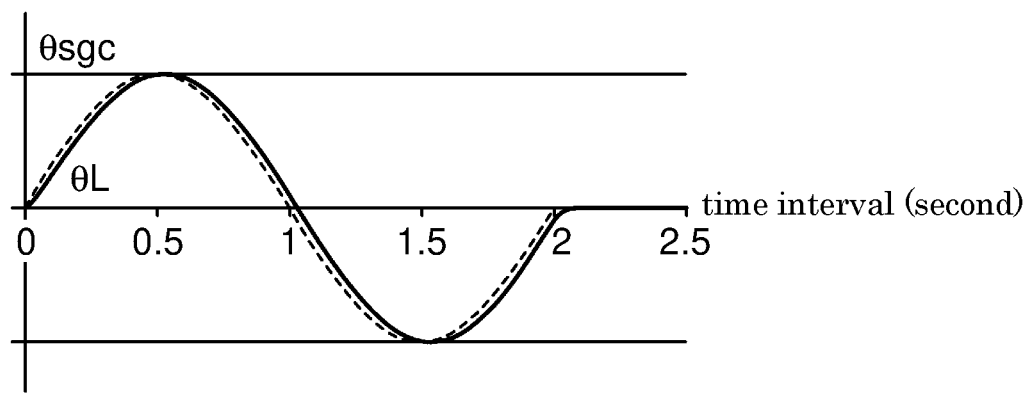
FIG. 16C shows a time waveform of the position command θc and the actual position θL when a sine wave of 0.5 Hz is applied as the position command θc to the main shafts.
Figure 16D:
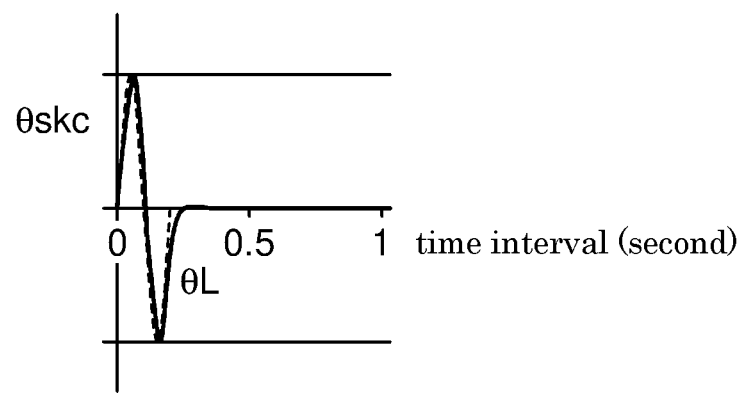
FIG. 16D shows a time waveform of the position command θc and the actual position θL when a sine wave of 5 Hz is applied as the position command θc to the main shafts.

FIGS. 16A and 16B show the response characteristics of the transfer function with respect to the operating frequency of the main shafts in the present exemplary embodiment. More specifically, FIG. 16A shows the frequency response characteristics of the amplitude of the transfer function WcL, and FIG. 16B shows the frequency response characteristics of the phase of the transfer function WcL. FIG. 16C shows a time waveform of the first position-command correction value θsgc and the actual position θL when a sine wave of 0.5 Hz is applied as the first position-command correction value θsgc to the main shafts having the frequency characteristics shown in FIGS. 16A and 16B. FIG. 16D shows a time waveform of the second position-command correction value θskc and the actual position θL when a sine wave of 5 Hz is applied as the second position-command correction value θskc to the main shafts.

As shown in FIG. 16C, the actual position θL fully follows the first position-command correction value θsgc. This value θsgc has a frequency of 0.5 Hz, which is the maximum oscillation frequency of robot arm 2 twisted by the gravitational torque τg. Furthermore, as shown in FIG. 16D, the actual position θL fully follows the second position-command correction value θskc having a frequency of 5 Hz in both amplitude and phase.

As described hereinbefore, in the present exemplary embodiment, the gravitational torque τg and the interference torque τa, which are different in operation response frequency and are contained in the external torque τddyn applied to robot arm 2, are separately calculated. These torques are used to find the first and second position-command correction values θsgc and θskc. This enables correcting the position command without overestimating the influence of bending due to the gravitational torque τg. These position-command correction values θsgc and θskc are added to the original position command θc so as to correct the position error of robot arm 2 with high accuracy. Bending correction blocks 24 receive seven position commands θc to θ7c sent from main control unit 22 to seven servo control units 23. Bending correction blocks 24 find the external torque value τdyn and the gravitational torque τg through the dynamic calculation based on the position commands θc to θ7c. This eliminates the need to provide a dedicated component such as a torque sensor for measuring the torque, thereby reducing the cost of robot 6 and robot control device 20. The interference torque τa is obtained by subtracting the gravitational torque τg from the external torque value τdyn. This allows easy separation between the gravitational torque τg and the interference torque τa, thereby correcting the position error of robot arm 2 caused by bending.

These days, the position teaching of robots is more and more performed not by the teaching playback method but offline using a GUI on a PC. According to the teaching playback method, it does not matter if there is a discrepancy between the tip position of robot arm 2 specified to motors 12 and the actual tip position as long as repeatability is high. Meanwhile, offline teaching needs absolute position accuracy, so that if bending correction is inappropriate, the robot cannot be controlled properly.

In the present exemplary embodiment, the position error of robot arm 2 due to bending can be corrected with high accuracy, so that the offline teaching can be performed smoothly.

Second Exemplary Embodiment

Figure 17:
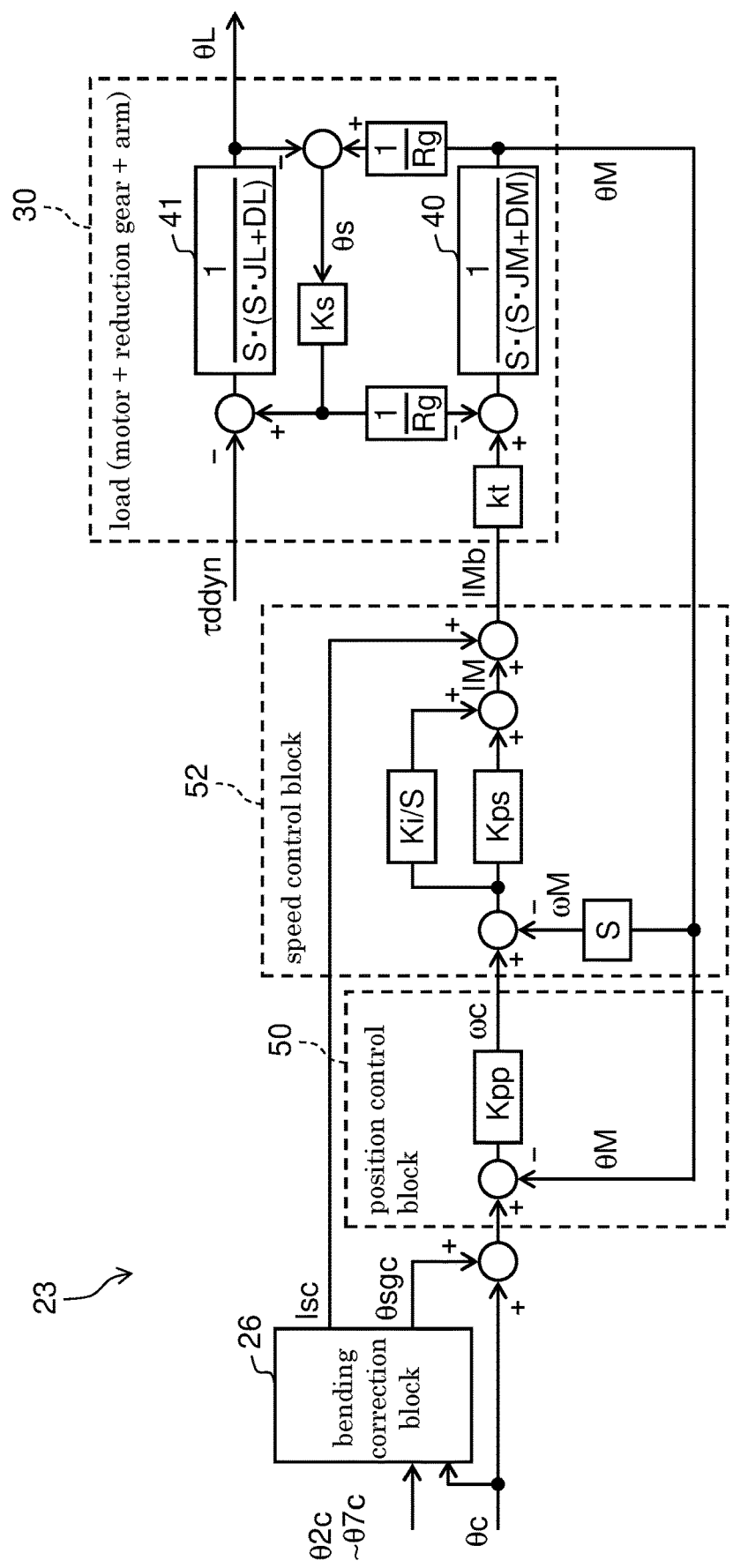
FIG. 17 is a block diagram of the first servo control unit in a second exemplary embodiment of the present disclosure.

FIG. 17 is a block diagram of the first servo control unit in the present exemplary embodiment. The present exemplary embodiment differs from the first exemplary embodiment in the following three aspects. Firstly, bending correction block 26 finds an interference torque current compensation value Isc (hereinafter, current compensation value) based on the interference torque τa. Secondly, the current compensation value Isc is added to the motor current command IM. Thirdly, the first position-command correction value θsgc alone is added to the position command θc.

Figure 18:
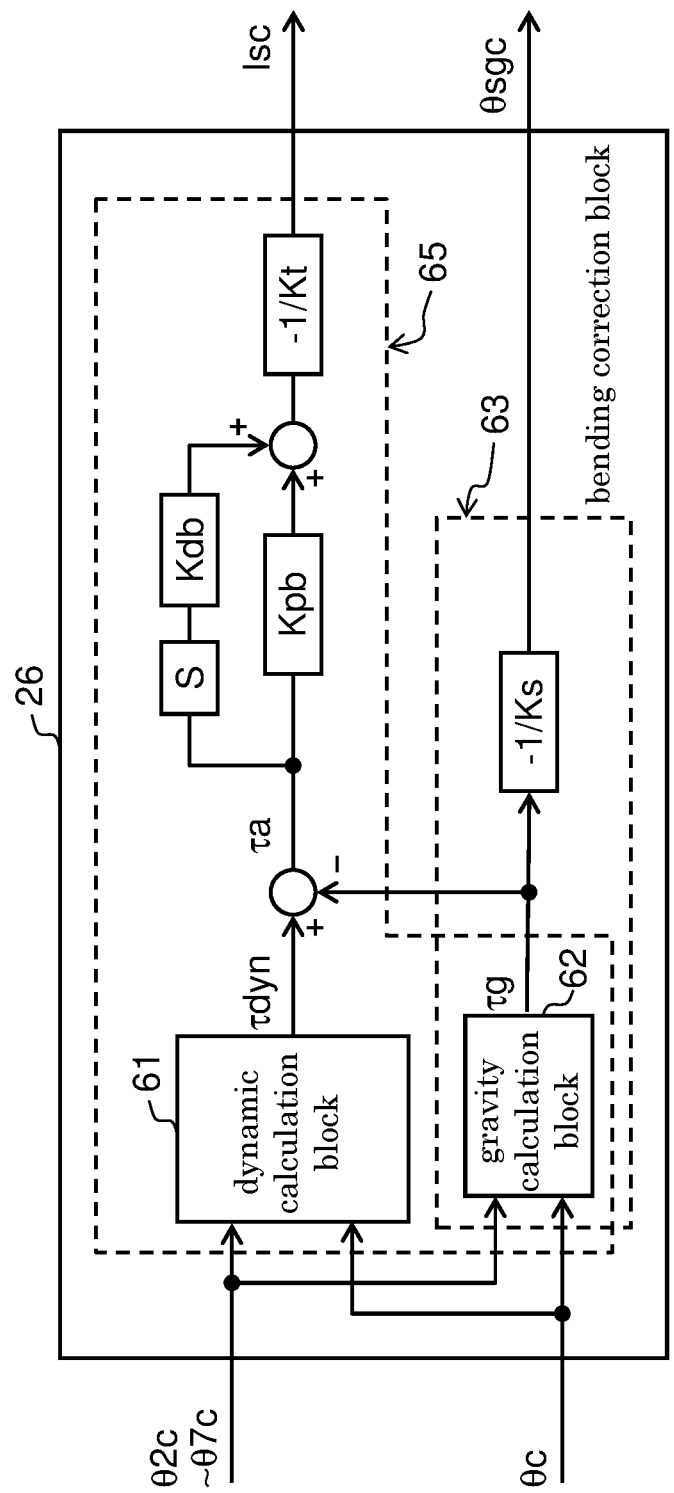
FIG. 18 is a block diagram of the bending correction block shown in FIG. 17.

FIG. 18 shows a detailed structure of the bending correction block shown in FIG. 17.

In bending correction block 26, gravity calculation block 62 calculates the gravitational torque τg, and the interference torque τa is calculated by Formula 7 similar to the first exemplary embodiment. The position-command correction value θsc shown in Formula 12 is changed as shown in Formula 13.

$$\theta sc = \theta sgc \qquad \text{Formula 13}$$

Meanwhile, the interference torque τa is used not to find the bending correction value θsac but to find the current corresponding to the bending correction value θsac. In this case, similar to the second position-command correction value θskc in the first exemplary embodiment, the current also needs to be compensated in amplitude and phase. Therefore, the current compensation value Isc is expressed by Formula 14 below.

$$Isc = (Kpb \times \tau a + Kdb \times (s \cdot \tau a)) \times (-1/Kt) \qquad \text{Formula 14}$$

where Kpb represents an interference-torque-current-compensation proportional gain, which is a coefficient for amplitude compensation. Kdb represents an interference-torque-current-compensation differential gain, which is a coefficient for phase compensation. The other calculation components are the same as mentioned above.

The motor current command IMb sent from speed control block 52 is expressed by Formula 15 below based on the value calculated by Formula 14.

$$IMb = IM + Isc \qquad \text{Formula 15}$$

Dynamic calculation block 61, gravity calculation block 62, and the calculate function of bending correction block 26, which is shown in Formulas 8 and 14, are together referred to as current compensation value calculation means 65.

As shown in FIG. 17, the position-command correction value θsc (=θsgc) expressed by Formula 13 is added to the position command θc sent from main control unit 22 to first servo control unit 23, so that a new position command (θc+θsgc) is obtained. The new position command is sent to the position control block 50 of first servo control unit 23. Furthermore, the current compensation value Isc is added to the motor current command IM generated in position control block 50 and speed control block 51 so that a new motor current command IMb is obtained. The new position command (θc+θsgc) and the new motor current command IMb are used to control the driving of first motor 12.

As described above, in the present exemplary embodiment, the current compensation value Isc to reduce the interference torque τa is added to the motor current command IM so as to apply bending correction based on the interference torque τa directly to the motor current. This improves the response of load 30, or in other words, the effect of correcting bending caused by the interference torque τa.

In the present exemplary embodiment, the bending due to the interference torque τa is corrected not by adding the position-command correction values θsc to θ7sc to the position commands θc to θ7c sent from outside block 50 or 52, but by adding the current compensation value Isc to the motor current command IM generated in blocks 50 and 52. Thus, the bending is compensated indirectly, so that the current compensation value Isc added to the motor current command IM does not necessarily entirely contribute to the bending reduction. Therefore, in some cases, determining the exact current compensation value Isc needs to perform operation verification using an actual articulated robot and gain adjustment.

The first and second exemplary embodiments have described seven-axis vertical articulated robot 6; alternatively, however, the number of joint shafts is not limited to seven and can be properly changed according to the specification of the robot. Robot control device 20 is configured so that n servo control units 23 (n is an integer not less than 2) drive the n servo motors 12 so as to drive n joint shafts connected to the n servo motors 12 through reduction gears 13. Furthermore, bending correction blocks 24 and 26 receive the n position commands θc to θnc sent from main control unit 22 to the n servo control units 23, and correct the position error of robot arm 2, which is caused by bending, based on these position commands. Thus, the robot control device of the present disclosure is applicable to articulated robots with two or more shafts.

INDUSTRIAL APPLICABILITY

The robot control device of the present disclosure separates the bending due to the gravitational torque and the bending due to the interference torque from other joint shafts from each other to correct their position commands separately. Thus, the robot control device, which can reduce the position error of a robot arm, is usefully applicable to welding robots and other industrial robots.

REFERENCE MARKS IN THE DRAWINGS 1 six-axis vertical articulated robot
2 robot arm
3 laser output device 4 laser light
5 workpiece
6 seven-axis vertical articulated robot
7 laser radiation position
8 rotation center position
11 robot mechanism
12 motor (servo motor)
13 reduction gear
14 encoder
20 robot control device
21 operation-teaching unit
22 main control unit
23 servo control unit
24 to 26 bending correction block (bending correction means)
30 load
31 first arm
32 primary side of the reduction gear
33 secondary side of the reduction gear
34 bearing
35 second arm
36 rotor
37 spring component of the reduction gear
40 motor transfer function
41 load transfer function
50 position control block
51, 52 speed control block
60, 61 dynamic calculation block
62 gravity calculation block
63 first position-command-correction-value calculation means
64 second position-command-correction-value calculation means
65 current compensation value calculation means
J1 to J7 joint shaft
θc to θ7c position command
IM motor current command
IMb motor current command
τddyn external torque
τa interference torque
τg gravitational torque

The invention claimed is:

1. A robot control device for controlling movement of a robot arm having a first joint shaft having a first position response frequency and a second joint shaft having a second position response frequency different from the first position response frequency, the first joint shaft driven through a reduction gear connected to a servo motor, the robot control device comprising:
   a hardware processor configured to execute at least one program and cause the robot control device to:
   transmit a first position command to the first joint shaft; and
   perform bending correction to correct a position error of the robot arm, the position error being due to bending of the reduction gear, the hardware processor further configured:
      to calculate separately a gravitational torque and an interference torque, the interference torque is applied from the second joint shaft, as part of an external torque causing the bending of the reduction gear,
         wherein, in the calculation for separating the gravitational torque and the interference torque, the hardware processor is configured:
         to calculate, based on the first position command, the external torque causing the bending of the reduction gear by a dynamic calculation,
         to calculate, based on the first position command, the gravitational torque as part of the external torque causing the bending of the reduction gear by a gravity calculation, the gravity calculation being performed through the dynamic calculation with a speed and an acceleration component of the first position command set to zero, and
         to calculate, by subtracting the gravitational torque calculated by the gravity calculation from the external torque calculated by the dynamic calculation, the interference torque, the interference torque being due to interference to which the first joint shaft is subjected, and
         whereby the gravitational torque and the interference torque are calculated separately;
      to determine a first position-command correction value based on the separated gravitational torque;
      to determine a second position-command correction value by multiplying the separated interference torque by coefficients for amplitude compensation and phase compensation; and
      to perform servo control to drive the servo motor based on a second position command obtained by adding the first position-command correction value determined from the separated gravitational torque and the second position-command correction value determined from the separated interference torque to the first position command.

2. A robot control device for controlling movement of a robot arm having a first joint shaft having a first position response frequency and a second joint shaft having a second position response frequency different from the first position response frequency, the first joint shaft driven through a reduction gear connected to a servo motor, the robot control device comprising:
   a hardware processor configured to execute at least one program and cause the robot control device to:
   transmit a first position command to the first joint shaft; and
   perform bending correction to correct a position error of the robot arm, the position error being due to bending of the reduction gear, the hardware processor further configured:
      to calculate separately a gravitational torque and an interference torque, the interference torque is applied from the second joint shaft, as part of an external torque causing the bending of the reduction gear,
         wherein, in the calculation for separating the gravitational torque and the interference torque, the hardware processor is configured:
         to calculate, based on the first position command, the external torque causing the bending of the reduction gear by a dynamic calculation,
         to calculate, based on the first position command, the gravitational torque as part of the external torque causing bending of the robot arm by a gravity calculation, the gravity calculation being performed through the dynamic calculation with a speed and an acceleration component of the first position command set to zero, and
         to calculate, by subtracting the gravitational torque calculated by the gravity calculation from the external torque calculated by the dynamic calculation, the interference torque, the interference torque being due to interference to which the first joint shaft is subjected, and whereby the gravitational torque and the interference torque are calculated separately;

to determine a first position-command correction value based on the separated gravitational torque; and to determine a current compensation value by multiplying the separated interference torque by coefficients for amplitude compensation and phase compensation; and to perform servo control to drive the servo motor based on following commands:

a second position command obtained by adding the first position-command correction value determined from the separated gravitational torque to the first position command, and a new motor current command obtained by adding the current compensation value determined separated from the interference torque to a motor current command generated based on the second position command.

3. The robot control device according to claim 1, wherein the servo motor is one of n servo motors, the n being an integer not less than 2, the reduction gear is one of n reduction gears connected to the n servo motors, the first joint shaft is one of n joint shafts driven through the n reduction gears, the servo control is one of n servo controls for driving the n servo motors, the position command is one of n position commands for specifying respective positions of the n joint shafts, the bending correction is one of n bending corrections corresponding to the n servo controls, and the position error of the robot arm due to the bending is corrected based on the n position commands.

4. The robot control device according to claim 2, wherein the servo motor is one of n servo motors, the n being an integer not less than 2, the reduction gear is one of n reduction gears connected to the n servo motors, the first joint shaft is one of n joint shafts driven through the n reduction gears, the servo control is one of n servo controls for driving the n servo motors, the position command is one of n position commands for specifying respective positions of the n joint shafts, the bending correction is one of n bending corrections corresponding to the n servo controls, and the position error of the robot arm due to the bending is corrected based on the n position commands.

5. The robot control device according to claim 1, wherein the first position-command correction value and the second position-command correction value are shown as following formulae:

$$\theta sgc = \tau g \times (-1/Ks)$$

$$\theta skc = Kpa \times \theta sac + Kda \times (s \cdot \theta sac)$$

$$\theta sac = \tau a \times (-1/Ks)$$

where $\theta sgc$ represents the first position-command correction value; $\theta skc$ represents the second position-command correction value; $\theta sac$ represents a bending correction value; $\tau g$ represents the gravitational torque; $\tau a$ represents the interference torque; $Ks$ represents a spring constant of the reduction gear; $Kpa$ represents a phase PD compensation proportional gain (a coefficient for amplitude compensation); $Kda$ represents a PD compensation differential gain (a coefficient for phase compensation); $s$ represents an integral component.

6. The robot control device according to claim 2, wherein the first position-command correction value and the current compensation value are shown as following formulae:

$$\theta sgc = \tau g \times (-1/Ks)$$

$$Isc = (Kpb \times \tau a + Kdb \times (s \cdot \tau a)) \times (-1/Kt)$$

where $\theta sgc$ represents the first position-command correction value; $Isc$ represents the current compensation value; $\tau g$ represents the gravitational torque; $\tau a$ represents the interference torque; $Ks$ represents a spring constant of the reduction gear; $Kt$ represents a torque constant of the servo motor; $Kpb$ represents an interference-torque-current-compensation proportional gain (a coefficient for amplitude compensation); $Kdb$ represents an interference-torque-current-compensation differential gain (a coefficient for phase compensation); $s$ represents an integral component.

* * * * *